US006326054B1

(12) United States Patent
Smith et al.

(10) Patent No.: US 6,326,054 B1
(45) Date of Patent: Dec. 4, 2001

(54) PROCESS AND MACHINE FOR COATING OPHTHALMIC LENSES

(75) Inventors: Kenneth L. Smith, Porum; Daniel P. Branch, Muskogee, both of OK (US)

(73) Assignee: Gerber Coburn Optical, Inc., South Windsor, CT (US)

( * ) Notice: Subject to any disclaimer, the term of this patent is extended or adjusted under 35 U.S.C. 154(b) by 0 days.

(21) Appl. No.: 09/542,766

(22) Filed: Apr. 4, 2000

Related U.S. Application Data

(62) Division of application No. 08/966,157, filed on Nov. 7, 1997, now Pat. No. 6,129,042.
(60) Provisional application No. 60/030,711, filed on Nov. 8, 1996.

(51) Int. Cl.[7] .............................. B05D 5/06; B05D 1/02; B05D 3/06
(52) U.S. Cl. ......................... 427/168; 427/164; 427/240
(58) Field of Search ................................. 427/164, 240, 427/168; 118/693, 694, 686

(56) References Cited

U.S. PATENT DOCUMENTS

| 4,092,097 | * | 5/1978 | Appel | 432/11 |
| 5,164,228 | * | 11/1992 | Peralta et al. | 427/164 |
| 5,240,746 | * | 8/1993 | O'Connell Litteral | 427/510 |
| 5,246,728 | * | 9/1993 | Rodriquez | 427/164 |
| 5,669,974 | * | 9/1997 | Cueller et al. | 118/686 |
| 5,685,908 | * | 11/1997 | Brytsche | 118/52 |
| 5,718,849 | * | 2/1998 | Maus et al. | 264/2.2 |
| 5,902,399 | * | 5/1999 | Courtenay | 118/52 |

* cited by examiner

*Primary Examiner*—Shrive P. Beck
*Assistant Examiner*—Michael Cleveland
(74) *Attorney, Agent, or Firm*—Frank J. Catalano

(57) ABSTRACT

In a process and machine for coating a surface of an ophthalmic lens, the lens is manually loaded by the operator to a wash/dry station within an enclosure of the coating machine. Thereafter, the machine computer controls the entire process. The machine is closed to minimize the introduction of external contaminates into the machine. Positive pressure and filtration of air is initiated in the enclosure before washing the lens. The loaded lens is washed and dried at the wash/dry station. The dried lens is transferred to a coating station within the enclosure and coated. The coated lens is transferred to a curing oven within the enclosure and cured. The cured lens is then discharged from the curing oven and the machine for collection by the operator. The machine can simultaneously process three lenses, one in the wash/dry/coat section, one in the cure section and one at a pick-off station between the wash/dry/coat and cure sections of the machine. A coated and cured lens can be produced in approximately sixty seconds.

25 Claims, 34 Drawing Sheets

PROCESS AND MACHINE FOR COATING OPHTHALMIC LENSES

This application is a divisional of application Ser. No. 08/966,157, filed Nov. 7, 1997, now U.S. Pat No. 6,129,042 which claims the benefit of U.S. Provisional Application No. 60/030,711, filed Nov. 8, 1996.

BACKGROUND OF THE INVENTION

This invention relates generally to the coating of ophthalmic lenses and more particularly concerns the automation of the lens coating process.

Present ophthalmic lens coating procedures include manual insertion of the lens into a washing chamber to be washed by hand or by use of a high pressure wash pump, drying the washed lens by manually holding the lens over a filtered compressed air jet, manually moving the dried lens to a coating apparatus in which the lens coating material is not recycled and then manually transferring the coated lens to a curing oven which is generally inaccurately controlled by use of a stop watch and potentiometer control.

These independent steps and the manner in which they are performed result in a slow, labor intensive process which wastes coating material and produces greater volume of hazardous waste material for disposal. The room in which these steps are performed must be environmentally controlled to minimize the risk of contamination during the process.

It is, therefore, an object of this invention to provide a process and machine for the automatic cleaning, coating and curing necessary to apply a scratch resistant coating to an ophthalmic lens. Another object of this invention is to provide a process and machine for coating ophthalmic lenses in a self-contained environment, eliminating the need for a "clean" room. A further object of this invention is to provide a process and machine for coating ophthalmic lenses which minimizes the use of hazardous or flammable solvents. Yet another object of this invention is to provide a process and machine for coating ophthalmic lenses that minimizes coating waste by recirculating coating. Still another object of this invention is to provide a process and machine for coating ophthalmic lenses that reduces operator exposure to coating by encapsulating the coating. Another object of the invention is to provide a process and machine for coating ophthalmic lenses that reduces operator decisions by use of computer control to instruct lens processing parameters. Yet another object of this invention is to provide a process and machine for coating ophthalmic lenses which eliminates process steps by automatically replenishing the coating supply and prompting the operator when the available coating has been exhausted. Still another object of this invention is to provide a process and machine for coating ophthalmic lenses which minimizes manual handling of the lens. Another object of this invention is to provide a process and machine for coating ophthalmic lenses that affords accurate control of the curing phase of the process. A further object of this invention is to provide a process and machine for coating ophthalmic lenses that facilitates operator adjustment of curing times in accordance with the strength of the curing device.

SUMMARY OF THE INVENTION

In accordance with the invention, a lens coater is provided which automatically controls the lens coating process from the insertion of the lens into the washer to the removal of the lens from the curer.

The back or concave portion of the ophthalmic lens is coated in a software controlled coating machine. The lens is attached to a rotating shaft on a slide conveyor having both lateral and vertical transfer paths. At the insertion end of the machine, the lens is mounted on the slide conveyor and above the washing and drying basin which is substantially cylindrical.

The lens is washed by a high pressure jet of deionized water directed at the radius of the concave lens surface while the lens is rotated at a preselected spin speed. As the lens rotates, the nozzle directing the water jet at the concave surface of the lens is rotated over an approximately 28 degree arc from the center of the lens toward the outer perimeter of the lens. The arc movement of the nozzle is controlled by a stepper motor with a cam linkage that causes the nozzle to shift outwardly at a slow rate of speed and inwardly at a high rate of speed so as to minimize operating time. In one wash cycle, the nozzle rotates outwardly twice and inwardly once.

The basin also includes one air nozzle directed upwardly at the concave surface of the lens and a second air nozzle directed inwardly toward the edge of the lens to apply breathable air from a tank at high pressure to the lens while the lens is spinning at a preselected lens drying speed. In the drying process, the air nozzle directed at the concave surface of the lens is twice outwardly and once inwardly pivoted over the 28 degree arc by the cam linked stepper motor.

When the drying cycle is completed, the lens is vertically transferred out of the washing/drying basin and horizontally transferred to a position above the coating basin. It is then vertically lowered into the coating basin for the coating process. The coating is applied by another nozzle under the control of the cammed stepper motor. In the coating process, the lens is caused to rotate at predetermined coating speeds. A low coating speed is used to dispense the coating from the nozzle to the concave surface of the lens. A high speed rotation of the lens is used when dispensing is complete to thin the coating. The operating speed of the cam is coordinated to the rotational speed of the lens so as to permit appropriate distribution of the coating material.

A coating material injection system distributes a specified quantity of coating material into the coating basin for a preselected number of lenses to be coated. That is, for one density of coating material, the unit may typically add 25 milliliters of coating material to the coating basin for every 588 lenses that are coated. For another density of coating material, 25 milliliters of coating material may be injected into the coating basin for every 392 lenses to be coated. These numbers have been found suitable in the preferred embodiment of the device hereinafter described, but they could vary considerably. A cartridge injection system which meters the use of the machine by the quantity of coating applied is preferred. The cartridge injection system allows the coating process to be changed by simply flushing the former coating out of the system and changing the cartridge. The cartridge contains a software pack which controls the operation of the system and thus provides the user the ability to change the operating parameters of the machine by merely changing a cartridge. This is especially beneficial to the user because upgrades to the machine can be made by simply providing to the user new cartridges containing the upgrade in the cartridge software. An additional advantage is that, since the unit automatically times the injection of coating from the cartridge into the basin in specified small doses, preferably in the 25 milliliter range, if the coating basin becomes tainted, only 25 milliliters of coating material need be replaced. Also, since the dosages are metered, the unit can give warning to the operator as to when the machine is low in coating material and can even shut the machine down automatically to prevent the dry operation of the device if coating reaches a predetermined minimal level. The injector includes a sensor for determining the level. Since the lens coater process is controlled by a stepper motor, preferably involving 200 steps per revolution, the timing of the coating operation is extremely accurate.

The injection system employs a fluid containing tube which dispenses fluid in response to the drive of a plunger. An information pack is disposed at the rear of the plunger with a probe at the rear of the information pack. A screw driven by the stepper motor drives the probe, information pack and plunger into the fluid cartridge on demand. The probe is electrically connected to the lens coater computer to provide the necessary data for system operation.

During the washing process, as the lens spins about the axis extending approximately through its center and transverse to the lens face, water is applied to the concave face of the lens through the nozzle orifice, the pressure being determined by the orifice size and pump serving the system. The nozzle reciprocates for three wetting sweeps, moving outwardly, inwardly and outwardly, after which water application is terminated. The nozzle then returns in one sweep to home at an inward setting directed approximately toward the center of the lens.

During the drying process, the upper drying nozzle directs air at approximately 45 psi at the lower circumferential edge of the lens so as to remove a bead of water that forms along this edge. It has been found most effective that the air injected through this edge drying nozzle be directed at an angle of approximately 30 degrees from vertical toward this circumferential edge.

In the coating process, a dwell time is provided in which the lens spins for a period of time between the demand for coating material and the actual application of the coating material to the lens. An EEPROM allows the user to set the dwell time. This is important because, if the dwell time is not correct, anomalies can result in the lens center.

During the washing and drying processes and the coating process, a slinger or cover mounted above the lens covers the open upper portion of the washing-drying basin so as to block the escape of mist from the washer-dryer basin into other parts of the machine.

After coating, when the conveyor has vertically removed the lens from the coating basin it then further laterally transfers the lens to a pick-off station until a traveling arm picks up the lens. After leaving the lens, the washing-drying and coating conveyor or slide then returns to its home position.

The pick-off arm delivers the lens to an oven through a lens receiving door which closes after the lens is received. A UV source is mounted above a substantially parabolic reflector. Preferably, the lower portion of the reflector is substantially parabolic while the sidewalls are more elliptical, The ultraviolet source is separated from the lens by a wire screen and shutter and a quartz lens which maintains air purity between the lens chamber and the UV source chamber. The receiving door maintains protection of the other portions of the coating machine from UV exposure and allows flow of clean air by convection. The exposure distance between the UV source and the lens is predetermined and a stepper motor controls the time of the UV system operation. This is far more accurate than the stop watch/potentiometer control previously known. An ultraviolet sensor is also provided above the curing oven. The sensor, which transforms light to energy, maximizes the life to of the UV sensor and measures the application of UV to the lens. Thus, the customer is able to monitor the UV level and, therefore, minimize the risk of damage to the lens. A shutter between the sensor and the oven reduces exposure of the sensor during unnecessary periods and therefore adds to the sensor life. When the curing of the lens is complete, the lens is discharged to the operator through a discharge door of the curing oven. The shutter mechanism extends the life of the UV lamp. The sensing mechanism permits a determination of the UV actually applied to the lens rather than merely measuring the ultraviolet output of the lamp. The cure time is user controlled so that if the UV lamp weakens, the cure time can be increased until the lamp can be replaced. The machine requires calibration approximately once in ten years. The time for UV curing can be established by the user/operator independently of the control time determined by the cartridge software.

The lens coating process and machine can simultaneously handle three lenses, one on the washer-dryer and coater conveyor, one at the pickoff station and one on the oven pick-off arm.

The fully automatic lens coating process and machine provide the highest level of lens coating technology and intelligence for a scratch resistant coating application. Only one coating is needed to coat hard resin, polycarbonate and high index lenses. New solids coating technology recirculates the coating, eliminating coating waste. A single machine automatically cleans, coats, and cures lenses with the push of a button. The preferred coating, contains no hazardous or flammable solvents. Use of non-solvent coating eliminates unpleasant odors caused by solvent coatings. Waste disposal issues are eliminated, Use of encapsulated coating drastically reduces operator exposure to coating. The software pack memory chip instructs the machine on lens processing parameters which reduces operator decisions. Automated coating replenishment eliminates processing steps. The coating dispenser cartridge prompts the operator when the coating cartridge is empty. A built-in display panel allows easy diagnostics of machine components. The self-contained cleaning system eliminates the need for a clean room environment. Yields are improved through reduced operator handling of lenses. A preferred embodiment of the machine is typically no more than 4 feet wide by 2⅔ feet deep by 4⅝ feet high and weighs less than 500 pounds.

BRIEF DESCRIPTION OF THE DRAWINGS

Other objects and advantages of the invention will become apparent upon reading the following detailed description and upon reference to the drawings in which:

FIG. 14 is a perspective assembly view of a preferred embodiment of a coating tube of the lens coating machine;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

General Physical Description and Operation

Figure 2:
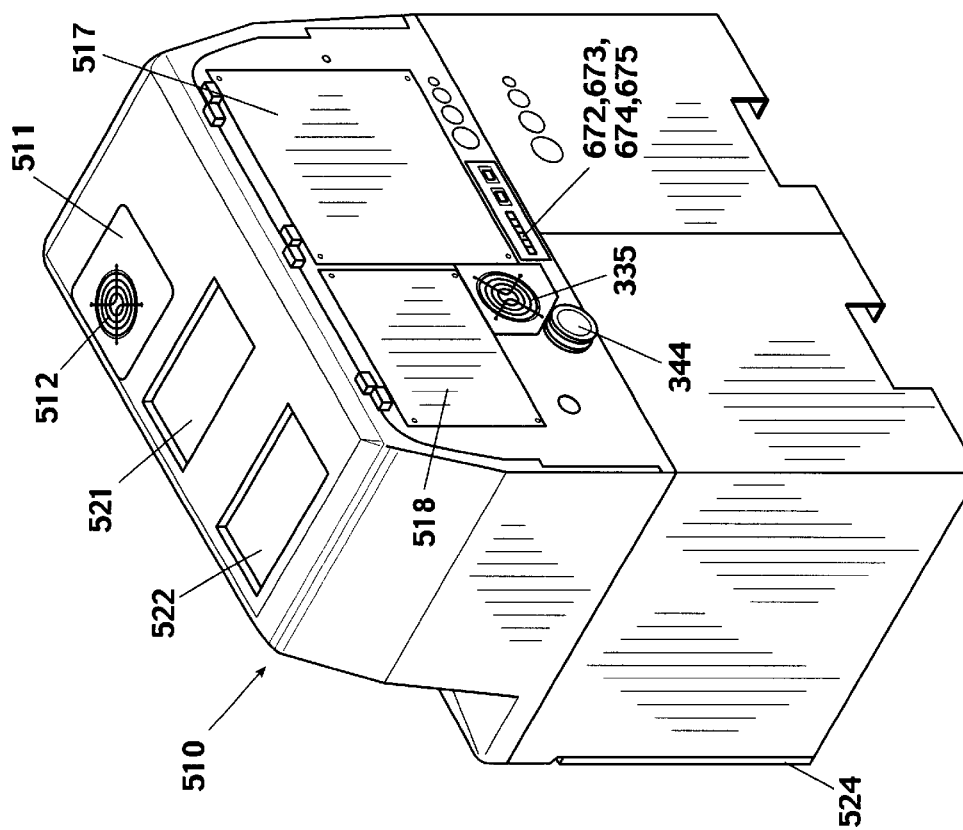
FIG. 2 is a rear perspective view of a preferred embodiment of the exterior of the lens coating machine.

The coating machine hereinafter described is a self-contained, single unit system designed for operator efficiency and ease of maintenance and part replacement. The general arrangement of the machine is best seen in reference to FIGS. 1, 2 and 3. For descriptive purposes, looking at FIG. 1, the machine is addressed as consisting of four quadrant-like sections which, moving clockwise from the upper left, can be broadly referred to as the coat side hood section, the cure side hood section, the cure side cabinet section and the coat side cabinet section.

Figure 3:
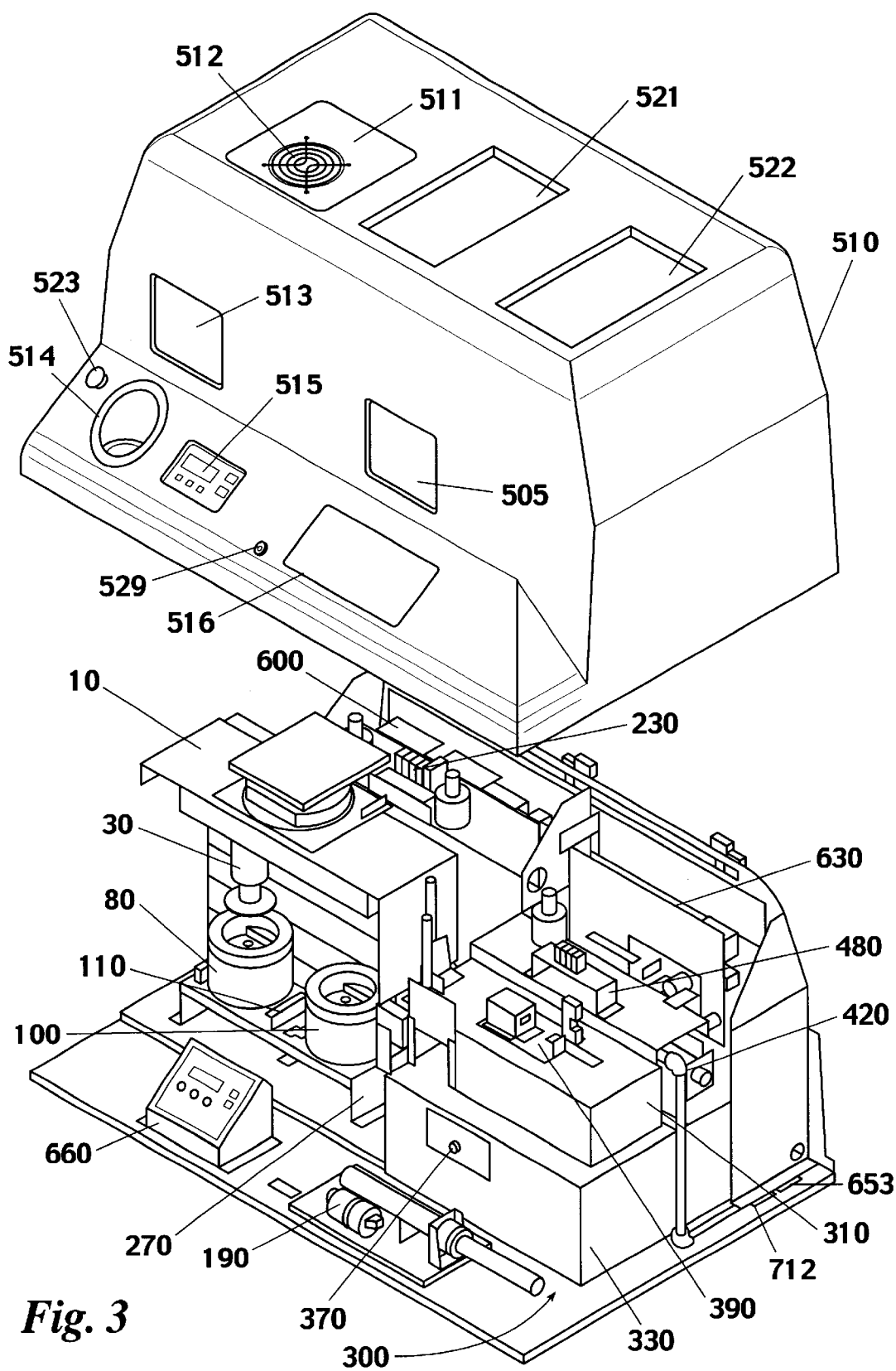
FIG. 3 is a front perspective assembly view of a preferred embodiment of the interior of the lens coating machine with some components removed.

Turning to FIG. 3, the coat side hood section contains a hepa filter assembly 10, a spin motor assembly 30, a spin motor transport assembly 50, a wash/dry basin assembly 80, a coat basin assembly 100, a cam nozzle assembly 110, a wash pump assembly 150, a clean air supply assembly 170, a coating pump assembly 190, a coat side valve assembly 230, a pick-off station assembly 270, a coat side electrical panel 600 and a control panel 660. In the general operation of the coat side hood section components, the hepa filter assembly 10 provides a clean environment for the coating process. A lens chucked to the spin motor assembly 30 is moved by the transport assembly 50 sequentially from the wash/dry basin assembly 80 where the lens is washed and dried to the coating basin assembly 100 where the lens is coated to the pick-off assembly 270 where the lens is dechucked and held for transfer to the cure side hood section of the machine. The cam/nozzle assembly 110 directs the distribution of water, air and coating to wash, dry and coat the lens, respectively. The wash pump assembly 150, the clean air supply assembly 170 and the coating pump assembly 190 supply the deionized water, air and coating necessary to wash, dry and coat the lens. The coat side valve assembly 230 provides the overall pneumatic control for the coat side components. The control panel 660 permits operator interface with the machine.

The cure side hood of the machine contains the ultraviolet curing oven assembly including an upper chamber 310, a lower chamber 330, an ultraviolet bulb enclosure 370, an ultraviolet sensor assembly 390, a pick-off arm assembly 420, a cure side valve assembly 480, and a cure side electrical panel 630. In the general operation of the cure side components of the machine, the coated lens is cured in the upper chamber 310 by the ultraviolet light passed from the ultraviolet bulb enclosure 370 in the lower chamber 330. A cooling fan assembly 337 in the lower chamber 330 controls the temperature in the oven to prolong the life of the UV bulb 376. The pick-off arm assembly 420 collects the coated lens from the pick-off station assembly 270, brings the coated lens into the upper chamber 310 of the oven for curing and ejects the cured lens from the machine when the process is complete. The sensor assembly 390 monitors the strength of the ultraviolet bulb 376. The cure side valve assembly 480 controls the operation of the cure side components.

Figure 1:
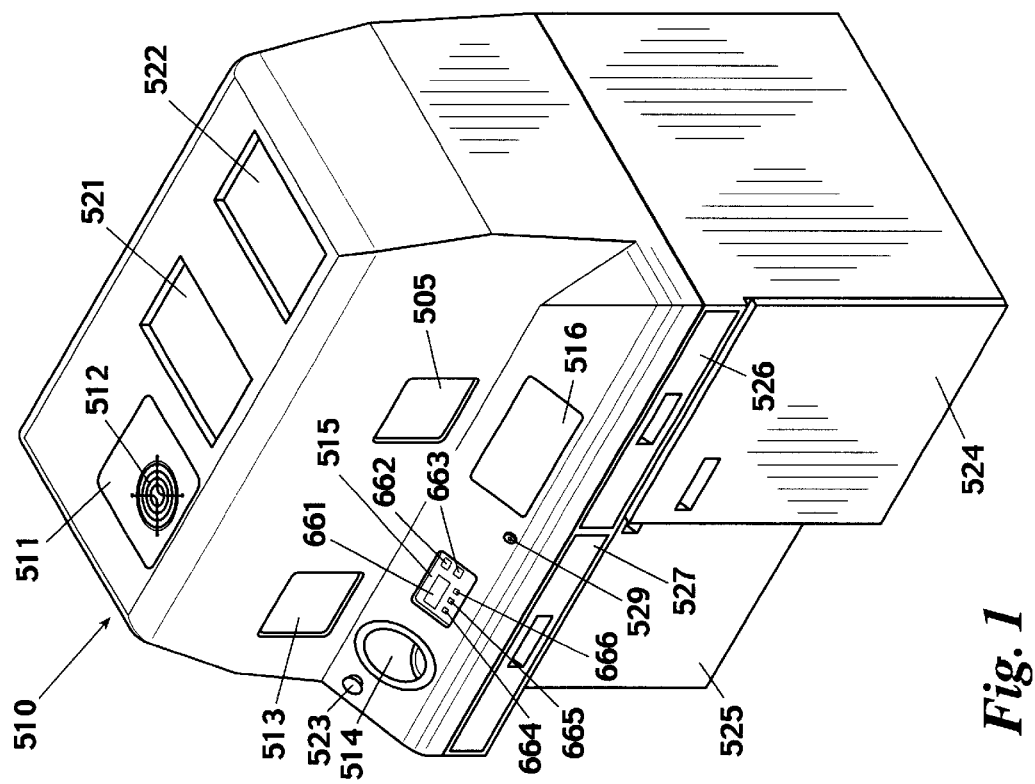
FIG. 1 is a front perspective view of a preferred embodiment of the exterior of the lens coating machine.

Referring to FIG. 1, the hood 510 has a hepa filter door 511 which provides access during maintenance to change out the hepa fan 18 and prefilter 21. A finger guard 512 covers the inlet to the hepa fan 18. The operator chucks the lens to be coated to the spin motor 31 through a lens inlet or access door 513. The cured lens is discharged for pick up by the operator through a lens outlet or discharge door 505 when the process is completed. A prewash bowl 514 is located below the access door. An opening 515 permitting observation of and access to the message screen 661, start/stop keys 662 and 663, menu select key 664, alter key 665 and next key 666 of the control panel 660 is in the front of the hood 510. Another opening 516 at the front of the hood 510 permits access to the coating filter 200 and the tube 202 of the coating pump assembly 190. Looking at FIG. 2, the back of the hood 510 includes an inlet protected by a fan guard 335 and an exhaust 344 for the cooling fan assembly 337, circuit breakers 672, 673, 674 and 675 for electrical power, a removable panel 517 for access to the coat side electrical panel 600 and a removable panel 518 for access to the cure side electrical panel 630. Tray recesses 521 and 522 in the top of the hood 510 are used to store lenses which are to be coated or which have already been cured by the machine. An emergency stop switch 523 at the front left of the hood 510 permits the operator to interrupt the operation of the machine at any time.

Returning to FIG. 1, the cure side cabinet section 524 of the machine contains an odor eliminator 692 and mist collector (not shown). The cost side cabinet 525 contains deionized water (not shown) and a drain bucket (not shown). Accessories drawers 526 and 527 are provided above each cabinet 524 and 525 for storage of supplies necessary to the operation of the lens coating machine. The hood 510 is hinged at the back to permit access to the coat side and cure side components of the machine and a key lock 529 is provided in the hood 510 to assure that the hood 510 will only be opened when machine repair or adjustment is necessary. The hood 510 should not be opened unnecessarily because the desired "clean" operating environment within the machine is achieved only after the hepa fan 18 has run for at least a twenty-four hour period after the hood 510 of the machine has been closed. Maintaining this clean environment is essential to quality lens coating.

Description and Operation of Component Assemblies

Figure 4:
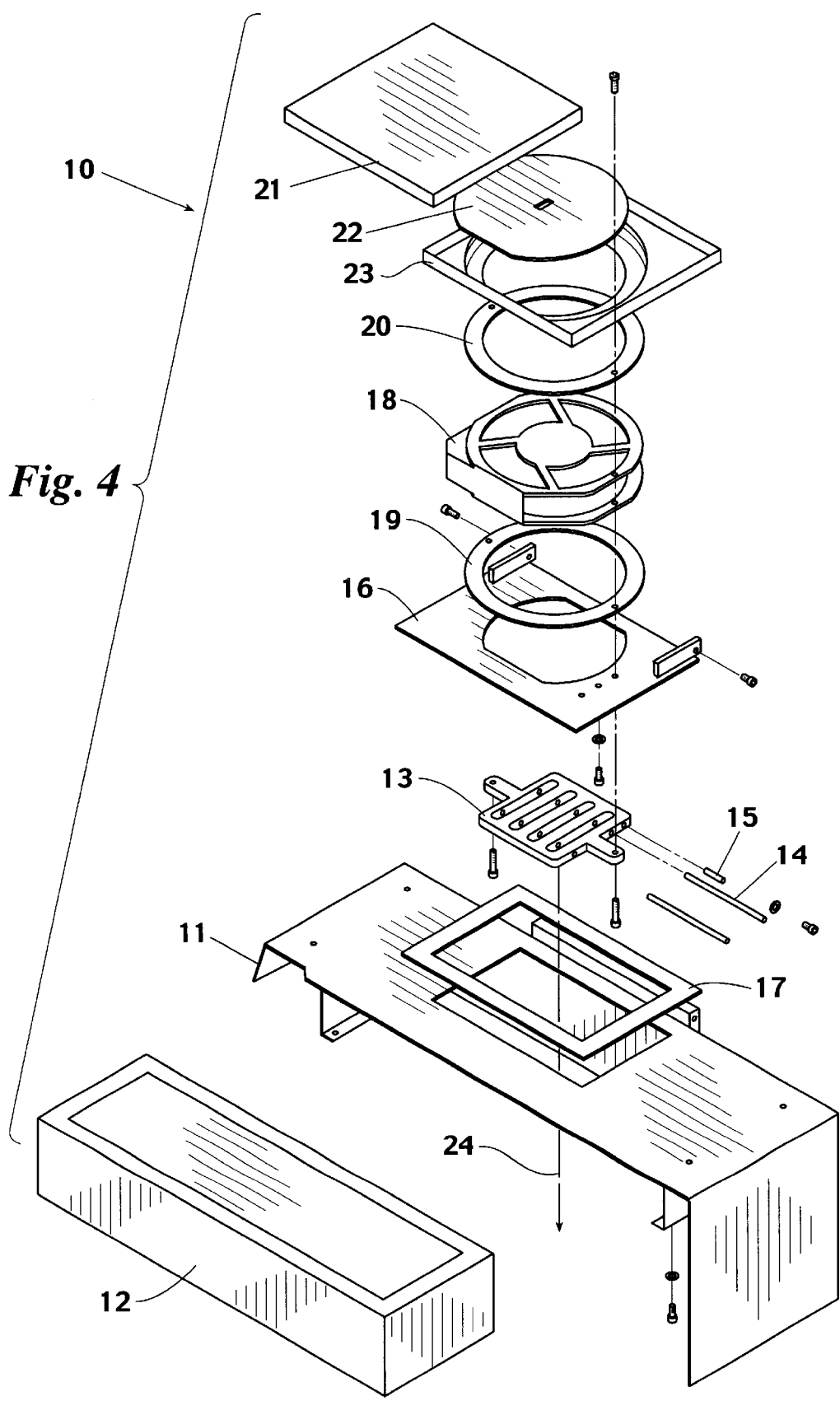
FIG. 4 is a perspective assembly view of a preferred embodiment of a hepa filter used to create a positive flow of air through the lens coating machine.

Looking at FIG. 4, the hepa filter assembly 10 consists of a base 11 which receives and supports the hepa filter 12 below a heater consisting of a heater block 13 in which a pair of pencil heaters 14 and a thermal fuse 15 are disposed. The filter 12 seals against the lower face of the base 11. The heater block 13 is held in place by a heater lid 16 which is secured to the support 11 with a heater lid gasket 17 between. A fan 18 seated on a fan gasket 19 on the heater lid 16 is disposed above the heater block 13. A prefilter pad 21 resting on a wire support 22 mounted in a prefilter holder 23 is bolted to the fan 18 with a seal 20 disposed between the filter 23 and the fan 18. The fan 18 draws air flow in a direction 24 from the prefilter pad 21 through the fan 18 and the heater block 13 into the hepa filter 12. The temperature of the air around the coating basin 101 is critical because variations in viscosity will be detrimental to adhesion of the coating to the lens. Therefore, a heat sensor 797 located proximate the coating basin 101 monitors the temperature and controls the operation of the heater block 13 and pencil heaters 14. The hepa fan 18 operates whenever the machine is plugged in and creates a positive air flow through the machine and particularly in the area of the coating basin assembly 100 to provide the desired clean environment.

Figure 5:
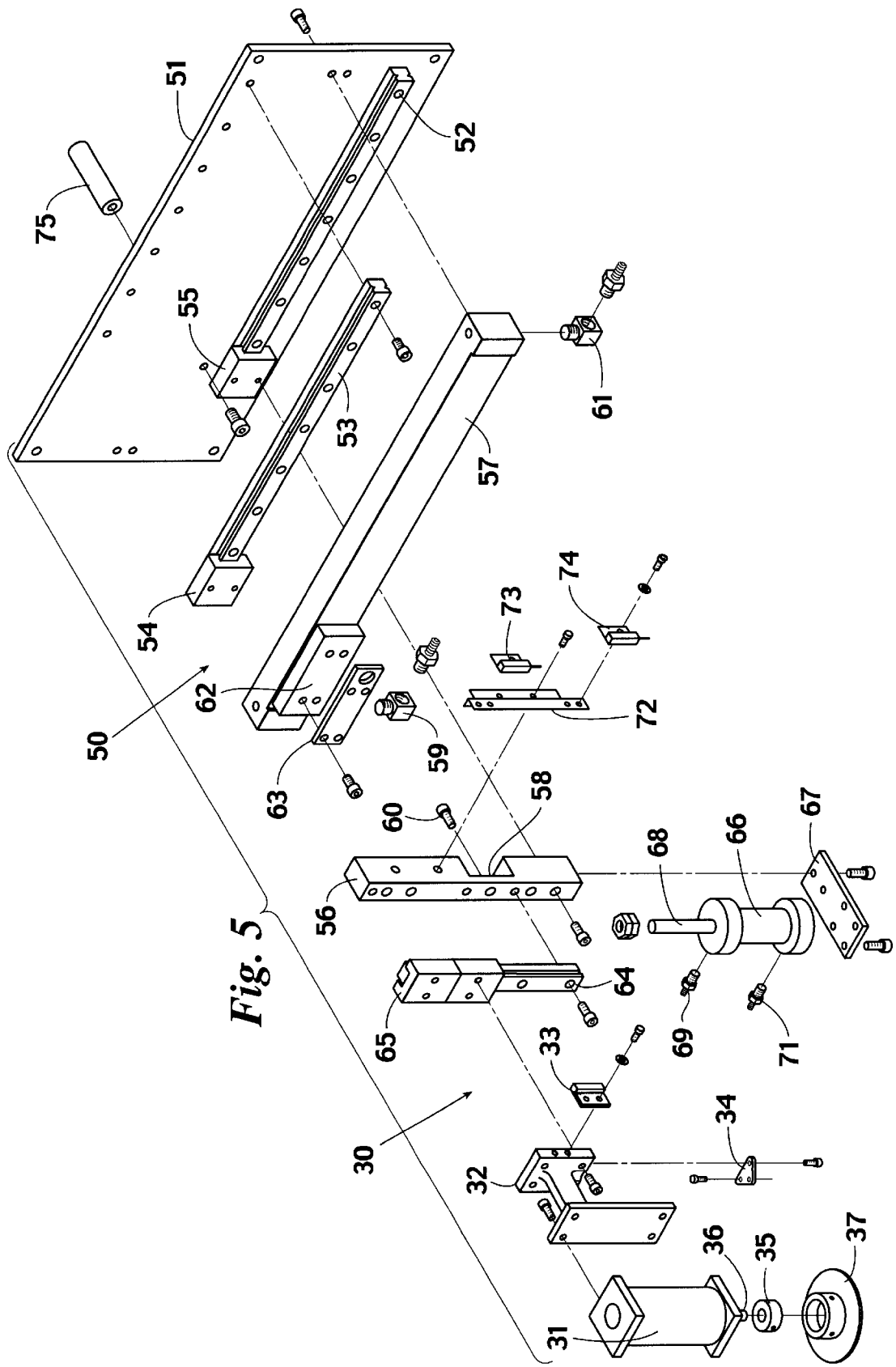
FIG. 5 is a perspective assembly view of a preferred embodiment of a spin motor assembly and transport assembly of the lens coating machine.
Figure 6:
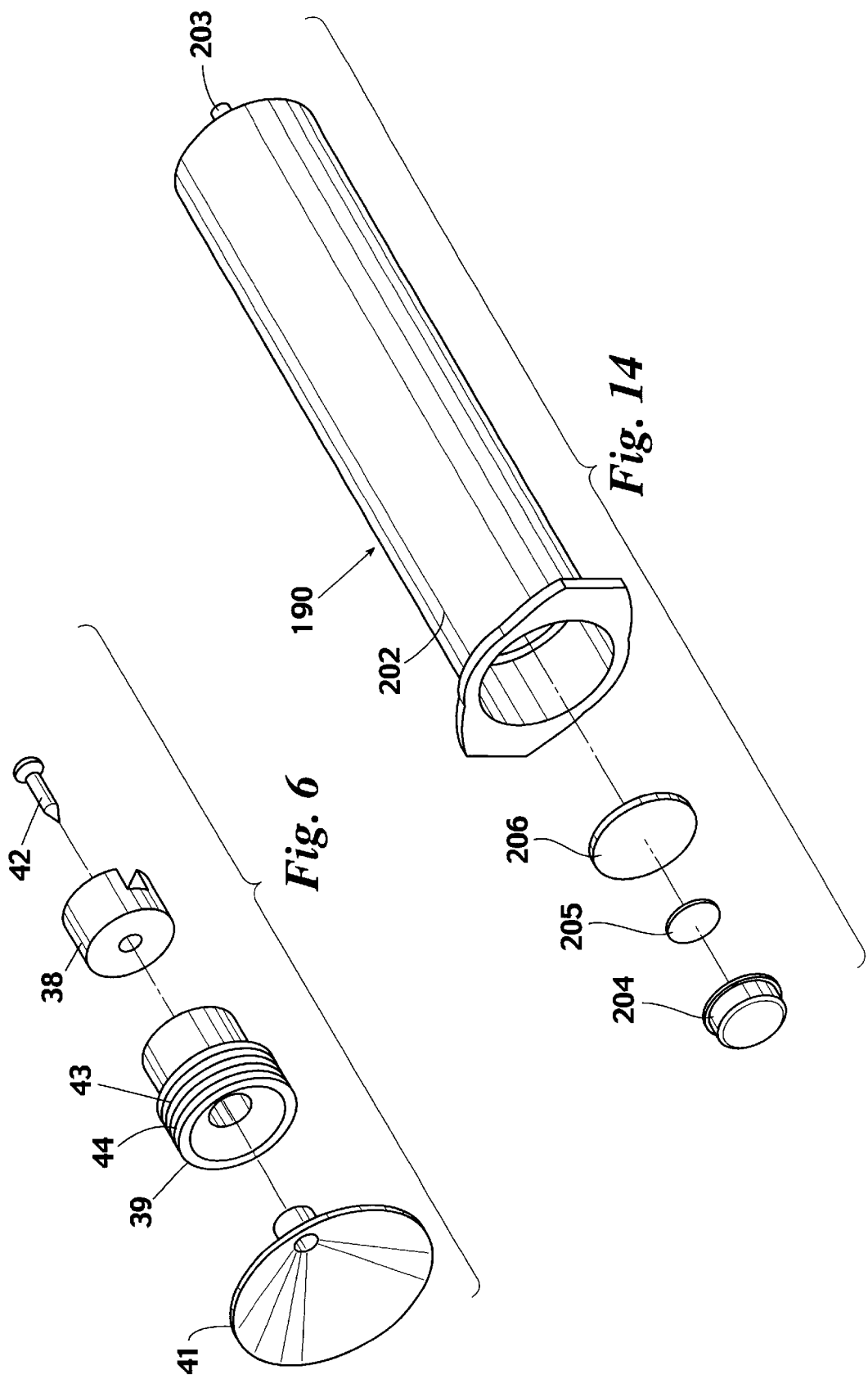
FIG. 6 is a perspective assembly view of a preferred embodiment of a lens holder of the spin motor assembly of FIG. 5.

The spin motor assembly 30 is illustrated in FIGS. 5 and 6 and includes a spin motor 31 mounted with its rotational axis in vertical alignment on a bracket 32 with a switch magnet 33 mounted on one side of the bracket 32 and a lift cylinder connector 34 mounted on the bottom of the bracket. A lens holder adapter 35 is mounted on the spin motor shaft 36 and a slinger 37 is mounted on the adapter 35 by use of set screws. As shown in FIG. 6, a magnet 38 slides into a lens holder adapter 39 and extends slightly above the lens holder adapter 39 for engagement with the lens holder adapter 35 on the spin motor shaft 36. A suction cup 41 for gripping the lens has a mounting portion insertable into the lens holder adapter 39. The suction cup 41, the adapter 39 and the magnet 38 are secured together by a screw 42. Thus, the lens adapter can be modified to accommodate various lens diameters by removing the screw 42, inserting an appropriately sized suction cup 41 into the adapter 39 and replacing the screw 42. The lens holder adapter 39 is provided with a pair of external annular grooves 43 and 44 for purposes to be hereinafter explained.

The spin motor transport assembly 50 is also shown in FIG. 5 and consists of a back plate 51 on which upper and lower long rails 52 and 53 are secured in horizontal alignment. Upper and lower bearings 54 and 55 slide on their respective rails 52 and 53 and a bearing tie block 56 connects the two bearings 54 and 55. A rodless air cylinder 57 is mounted in horizontal alignment on the back plate 51 between the rails 52 and 53. The tie block 56 is provided with a notch 58. A left hand air inlet elbow 59 admits air into the cylinder 57 to drive its piston to the right and a right hand air inlet elbow 61 admits air into the cylinder 57 to move its piston to the left. The piston is connected to a cylinder plate 62 which reciprocates along the exterior of the cylinder 57 with the piston. A second plate 63 mounted to the first plate 62 permits adjustment for tolerance with respect to other parts of the spin motor transport assembly 50. A screw 60 threaded into the notch 58 engages with an aperture in the second plate 63 so that the piston drives the tie block 56. A short rail 64 is vertically aligned on the front face of the tie block 56 and a short rail bearing 65 reciprocates vertically on the short rail 64. A lift cylinder 66 mounted on a support 67 has the upper end of its shaft 68 engaged with the lower face of the connector 34 on the spin motor bracket 32 which is mounted on the bearing 65. Upper and lower air inlets 69 and 71 admit and release air to permit downward and upward movement of the lift cylinder shaft 68, respectively. Thus, the spin motor assembly 30 can be vertically reciprocated on the short rail 64 in response to the operation of the lift cylinder 66 and can be reciprocated horizontally in response to the flow of air in the rodless air cylinder 57. An up/down switch bracket 72 supports reed switches 73 and 74 which respond to the magnet 33 to signal the upper and lower limits of motion of the short rail 64 of the CPU 614. Three additional reed switches 697, 698 and 699 shown in FIG. 33 and mounted on the rodless air cylinder 57 cooperate with the magnet 33 to signal the left, intermediate and right horizontal positions of the spin motor 31 to the CPU 614 as will hereinafter be explained. A spacer 75 on the back of the back plate 51 spaces the outside electrical panel 600 from the spin motor transport assembly 50.

Figure 7:
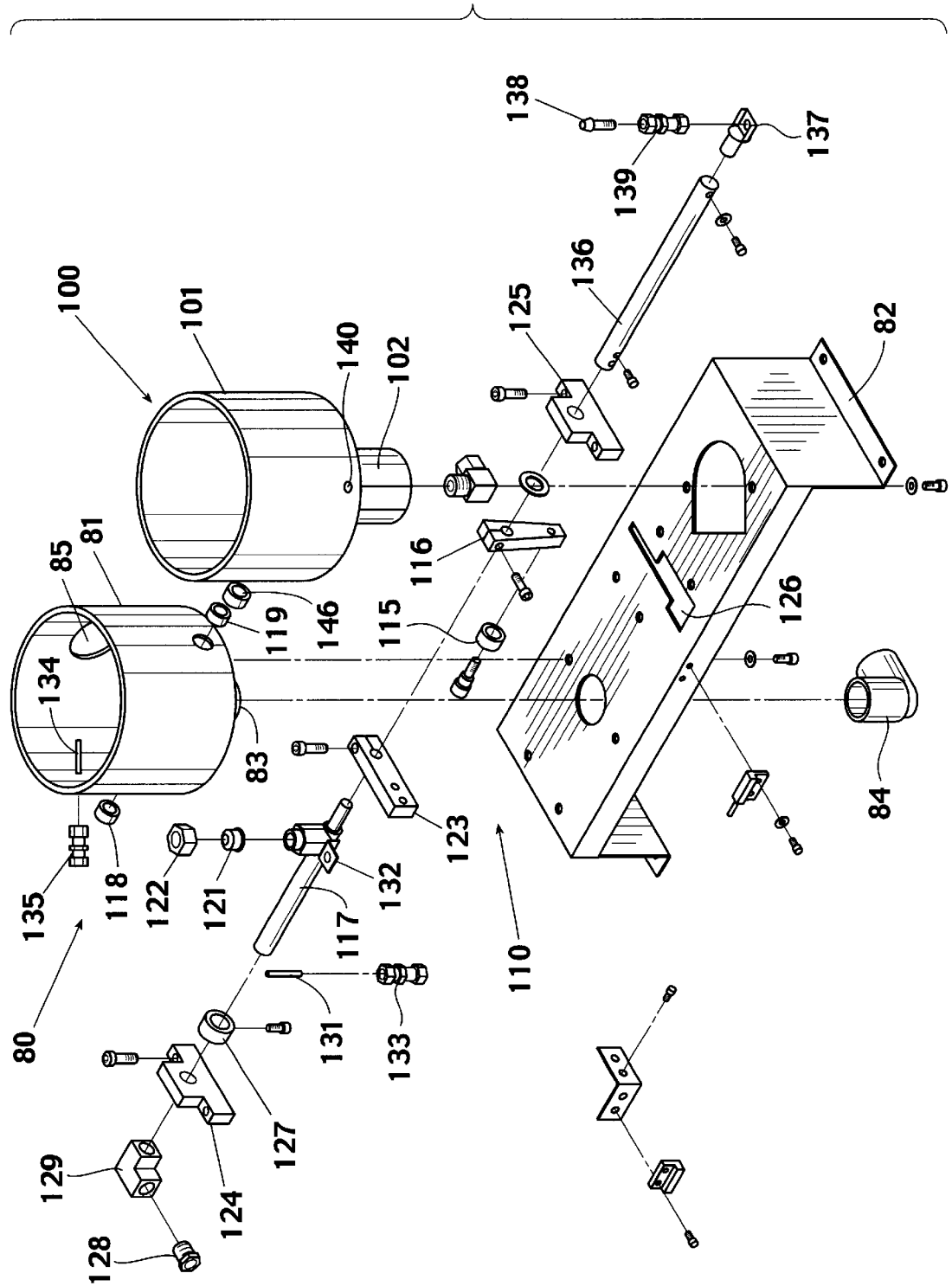
FIG. 7 is a perspective assembly view of a preferred embodiment of the wash/dry and coating basin assemblies of the lens coating machine.
Figure 8:
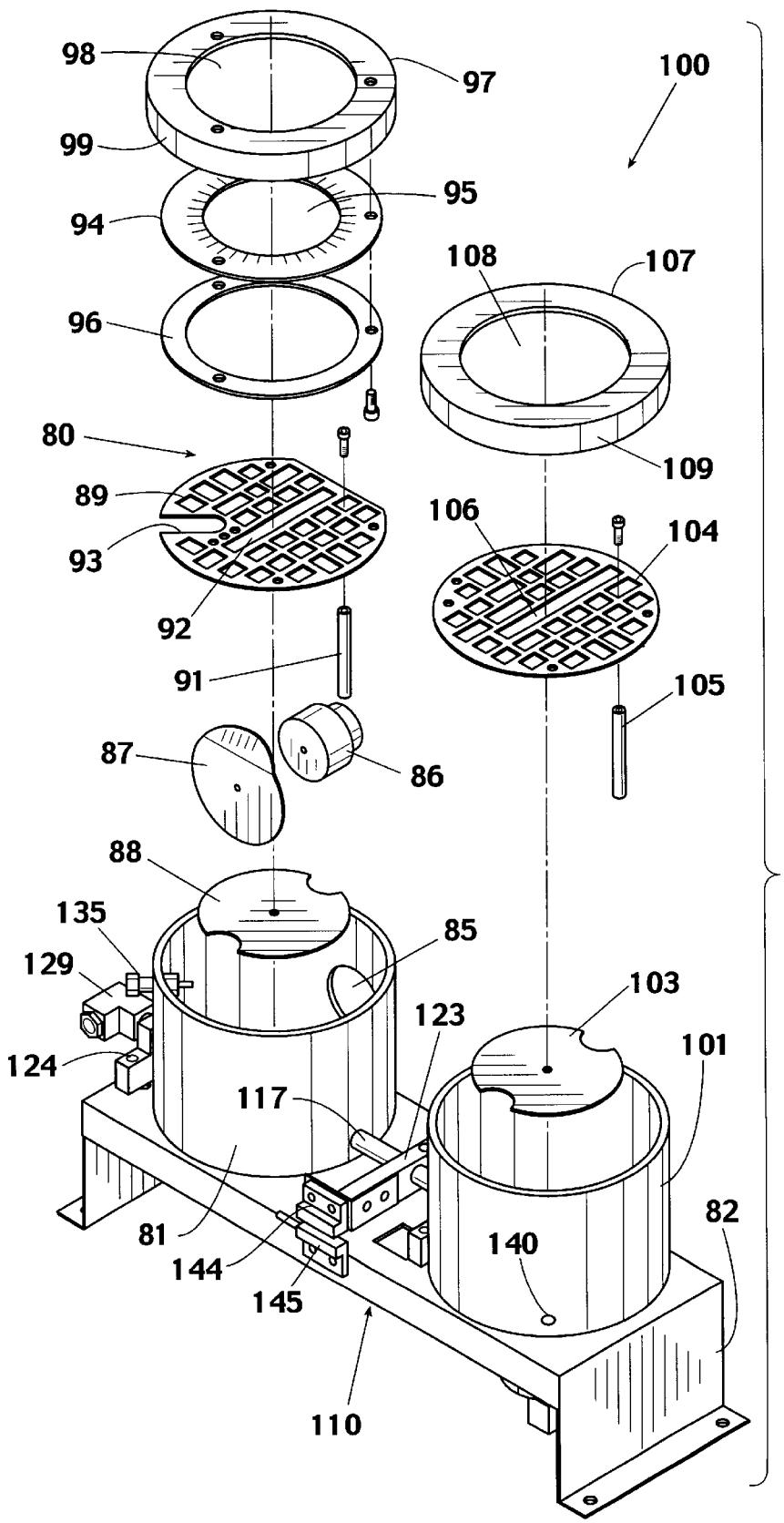
FIG. 8 is a perspective assembly view of a preferred embodiment of the wash/dry and coating basin assemblies of the lens coating machine.
Figure 9:
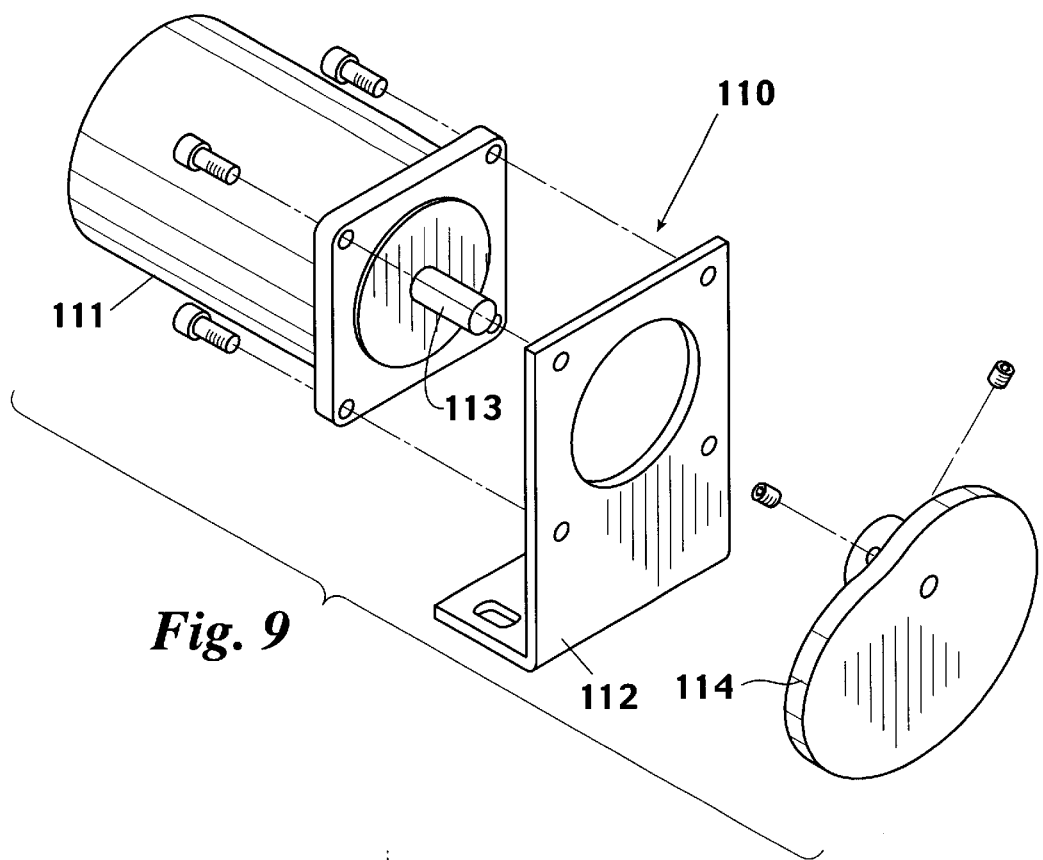
FIG. 9 is a perspective assembly view of a preferred embodiment of the cam nozzle assembly for use with the basin assemblies of FIGS. 7 and 8.
Figure 10:
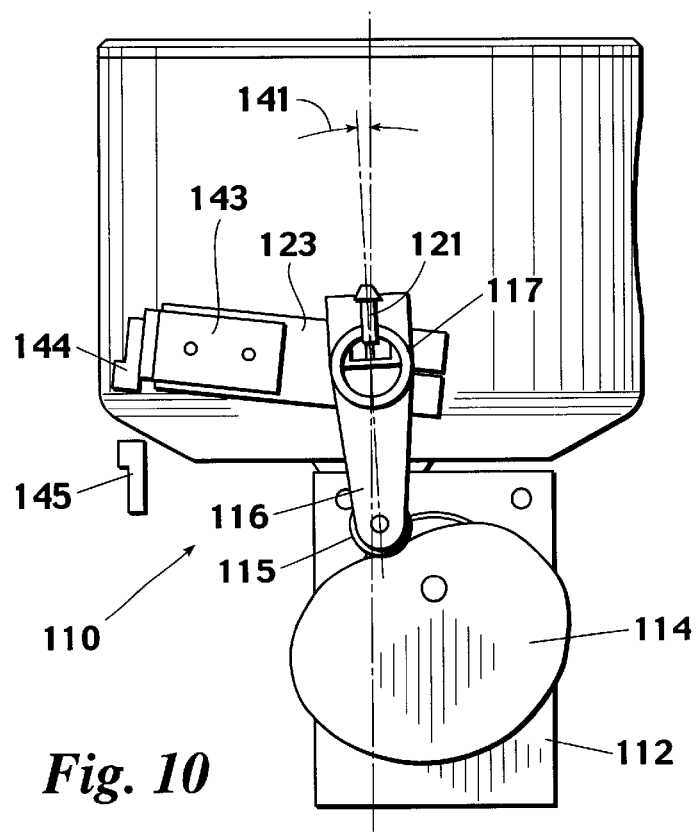
FIG. 10 is a side elevation view of the cam-nozzle assembly of FIG. 9.

Turning now to FIGS. 7 and 8, the wash/dry basin assembly 80 is illustrated. The wash/dry basin 81 is seated on the left side of a basin support 82 and has a neck 83 extending downwardly from its bottom through the support 82 for connection to an elbow 84 through which the basin 81 is drained into a bucket (not shown) in the coat side cabinet 525. A vent hole 85 is provided in the rear wall of the basin 81 with a vent plug 86 disposed in the hole 85 and a vent shield 87 screwed to the plug 86 within the basin 81. The plug 86 is a mist collector connected by a hose (not shown) to the odor eliminator 692 shown in FIG. 33 and located in the coat side cabinet 525. A screen 88 is disposed in the bottom of the basin 81 to guard the neck 83 to the drain. A lens guard 89 is seated on four lens guard supports 91 extending upwardly from the bottom of the basin 81. The lens guard 89 is provided with a diametric slot 92 and a radial slot 93 for reasons hereinafter explained. The lens guard 89 is screwed to the supports 91 and prevents a lens from dropping into the cam nozzle assembly 110. A rubber shield 94 with a concentric opening 95 through it is sandwiched between a retaining ring 96 and a basin cover 97 with a concentric opening 98 through it and serves as a splash guard over the basin 81. The shield 94 and ring 96 are seated in an annular flange 99 extending downwardly from the cover 97 and screwed in place. The cover 97 is seated on top of the basin 81 with the flange 99 around the upper perimeter of the basin A1. The slinger 37 fits into the cover opening 98 when the spin motor assembly 30 is at its lowest position to complete the covering of the basin 81.

Continuing to look at FIGS. 7 and 8, the coat basin assembly 100 includes a coat basin 101 which is seated on the right side of the basin support 92 with a reservoir 102 having a flat wall on one side extending from the bottom of the basin 101 through the support 82. A basin screen 103 is seated in the bottom of the basin 101 to guard the reservoir 102. The reservoir 102 stores coating material and typically is sized to store approximately 100 milliliters of coating. A lens guard 104 screwed to four lens guard supports 105 has a diametric slot 106 for reasons hereinafter explained. The lens guard supports 105 are seated on the bottom of the basin 101 and support the lens guard 104 at an elevated position within the basin 101 to prevent a lens from dropping into the cam/nozzle assembly 110. A basin cover 107 having a concentric opening 108 and a downwardly depending annular flange 109 is seated on the upper rim of the basin 101 with the flange 109 around the basin 101 and cooperates with the slinger 37 as described in relation to the wash/dry basin 81 to cover the coating basin 101.

Looking now at FIGS. 7 through 10, the cam nozzle assembly 110 is shown. A stepper motor 111 is mounted to a bracket 112 which is secured to the machine frame below the basin support 82. The motor 111 has a shaft 113 to which is secured a cam 114, perhaps by set screws. The shape of the cam 114 is contoured to maintain constant application speed of coating to the lens and facilitates rapid return to the home position when the stroke is completed. A cam follower 115 which traces the perimeter of the cam 114 is rotatably mounted on a cam arm 116. A wash basin tube 117 extends horizontally through diametrically aligned holes at the bottom of the wash basin 81 with seals 118 and 119 preventing leakage from the wash basin 81. The tube 117 has an upwardly directed water nozzle 121 secured in place by a cap 122. A switch arm 123 is fastened to the tube 117 between the water nozzle 121 and the cam arm 116. The wash basin tube 117 is journalled for rotation at one end in a first bearing 124 and is connected at its other end to a coating tube 136 which is journalled in a second bearing 125. The bearings 124 and 125 are bolted to the basin support 82. A slot 126 in the basin support 82 permits the cam to protrude through the base 82 to contact the follower 115. A collar 127 mounted on the end of the tube 117 opposite the nozzle end maintains the longitudinal position of the tube 117 between the brackets 124 and 125. The deionized water path into the wash/dry basin 81 extends from a bushing 128 through an elbow 129 to the end of the tube 117 extending through the first bearing 124. Deionized water passes through the tube 117 and then upwardly through the nozzle 121 toward the lens through the slot 92 in the lens guard 89 in the wash/dry basin 81. An upwardly directed air nozzle 131 is fixed to a lug 132 extending radially from the tube 117 proximate the water nozzle 121 by a union 133. A second air nozzle 134 is mounted inside the upper portion of the wash/dry basin 81 by a union 135 so as to be directed upwardly, preferably at approximately a thirty degree angle, at the edge of the lens in the wash/dry basin 81. The other end of the coating tube 136 has a coating nozzle support 137 fastened to it. A coating nozzle 138 is secured in a substantially vertical position to the support 137 by a union 139. A seal 146 prevents leakage of coating from the coating basin 101 at the point of entry of the coating tube 136 into the coating basin 101. The direction of the water nozzle 121, the air nozzle 131 and the coating nozzle 138 which rotate radially on the axis of the tube 117 is set so that water, air or coating ejected from their respective nozzles are directed proximate the center of a lens disposed within the wash/dry basin 81 or the coating basin 101 and will trace a radial path on the lens as the tubes 117 and 136 are rotated in the bearings 124 and 125. The upper air nozzle 134 is directed upwardly above the radial slot 93 in the lens guard 89 at the edge of a lens inserted into the wash/dry basin 81 so as to dry the perimeter and edge of the lens. Coating is introduced into the coat basin 101 through an aperture 140 in the coat basin wall proximate the bottom of the coat basin 101. As can best be seen in FIG. 10, the nozzles 121, 131 and 138 are preferably positioned at an angle 141 which is approximately three degrees off vertical. The rotation of the tubes 117 and 136 are controlled by use of a magnet 144 which is secured to the switch arm 123 by a bracket 143. A reed switch 145 mounted on the basin support 82 cooperates with the magnet 144 to signal the CPU 614 when the nozzles 121, 131 and 138 are in their home position.

Figure 11:
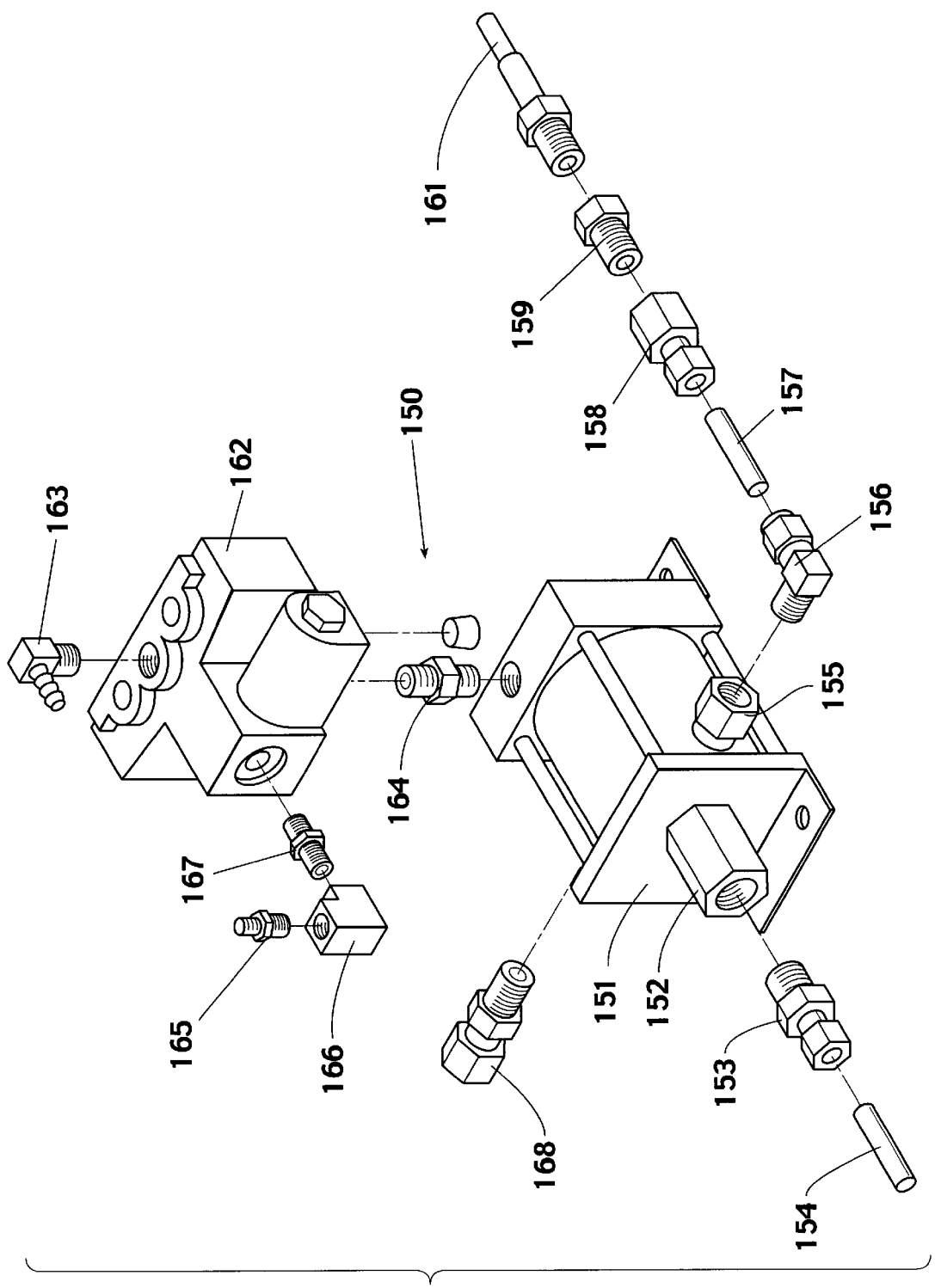
FIG. 11 is a perspective assembly view of a preferred embodiment of a wash pump assembly of the lens coating machine.

Turning to FIG. 11, the water pump assembly 150 is illustrated. A water pump 151 has its input 152 connected by a connector 153 to a deionized water input tube 154 which extends to the deionized water source (not shown) in the coat side cabinet 525. The output 155 of the water pump 151 is connected through an L connector 156 to a tube 157, a connector 158, a bushing 159 and a wash tube 161 to the bushing 128 of the cam/nozzle assembly 110 illustrated in FIG. 7. A solenoid valve 162 which controls the operation of the water pump 151 by use of air constantly applied through a connector 163 is connected to the water pump 151 by a nipple 164. Input air is also constantly provided to the solenoid 162 through an input 165, an elbow 166 and a nipple 167 as a pilot assist to prime the solenoid 162. The operation of the solenoid 162 is controlled by the CPU 614 to activate and deactivate the wash pump 151 as required and any failure of the system is displayed on the control panel display screen 661. A switch 711 in the hood 510 prevents operation of the water pump 151 when the hood 510 is open. The pump 151 is also provided with a drain connector 168 to allow water to escape in the event of leakage.

Figure 12:
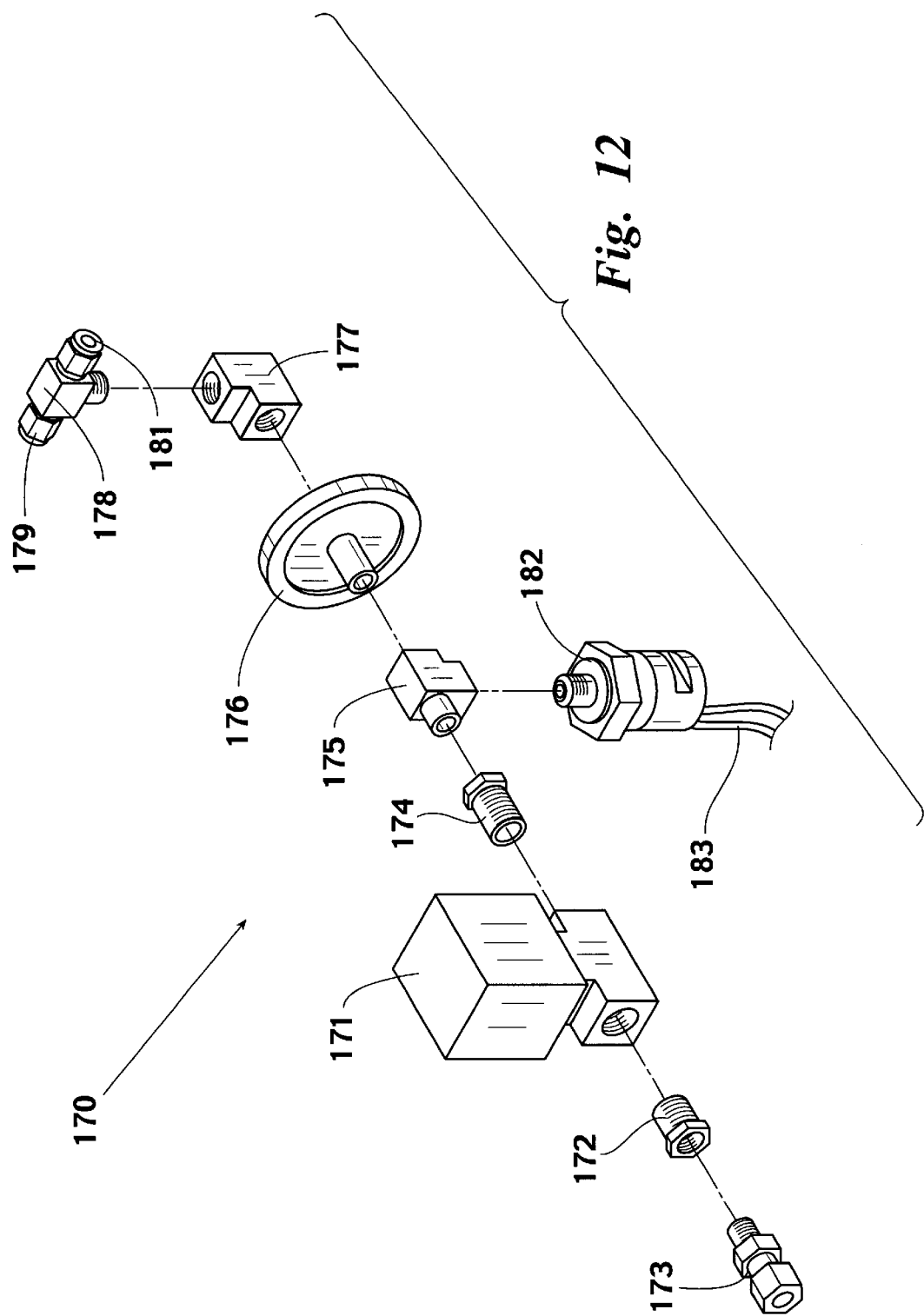
FIG. 12 is a perspective assembly view of a preferred embodiment of a clean air supply assembly of the lens coating machine.
Figure 13:
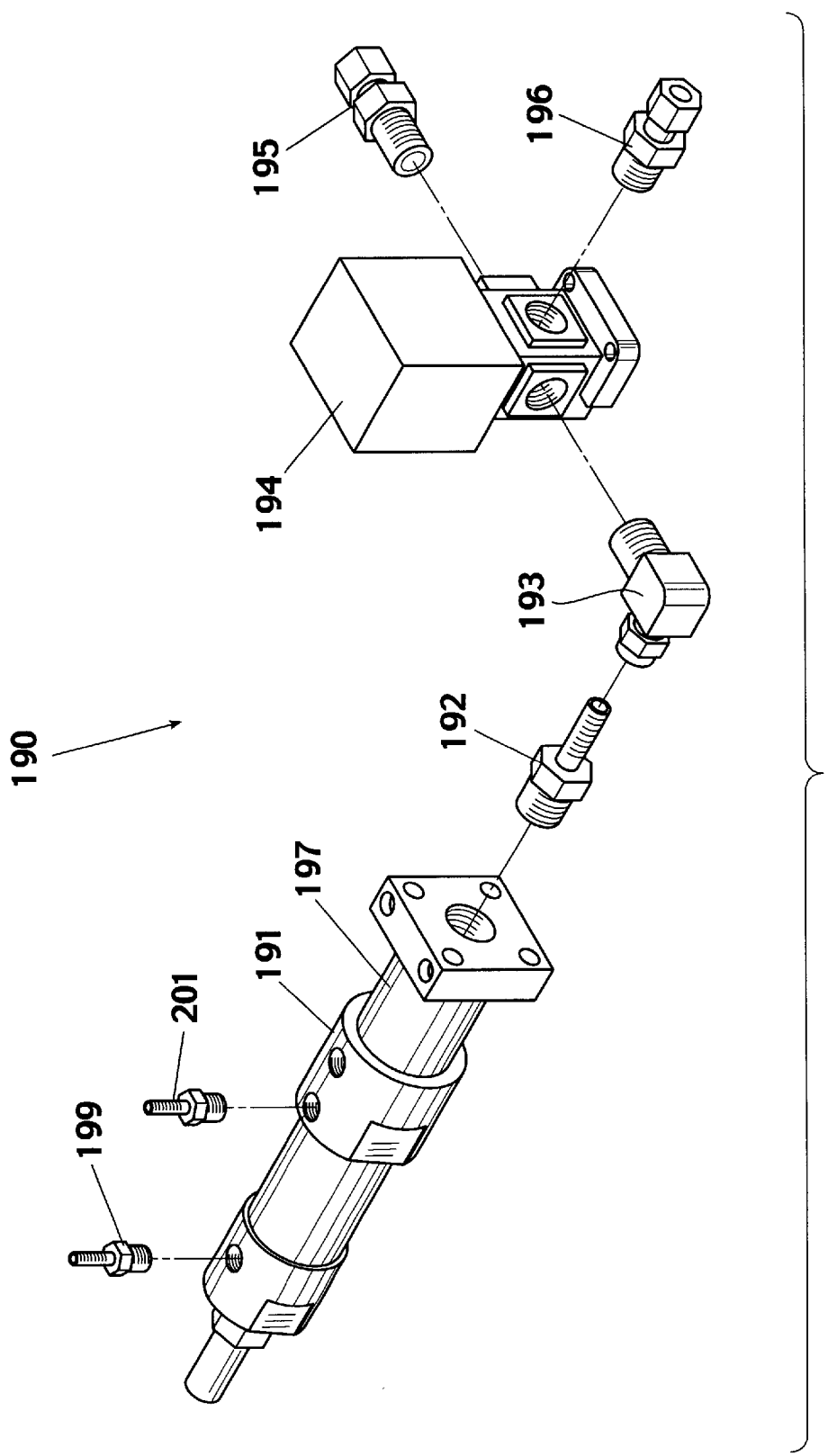
FIG. 13 is a perspective assembly view of a preferred embodiment of a coating pump assembly of the lens coating machine.
Figure 15:
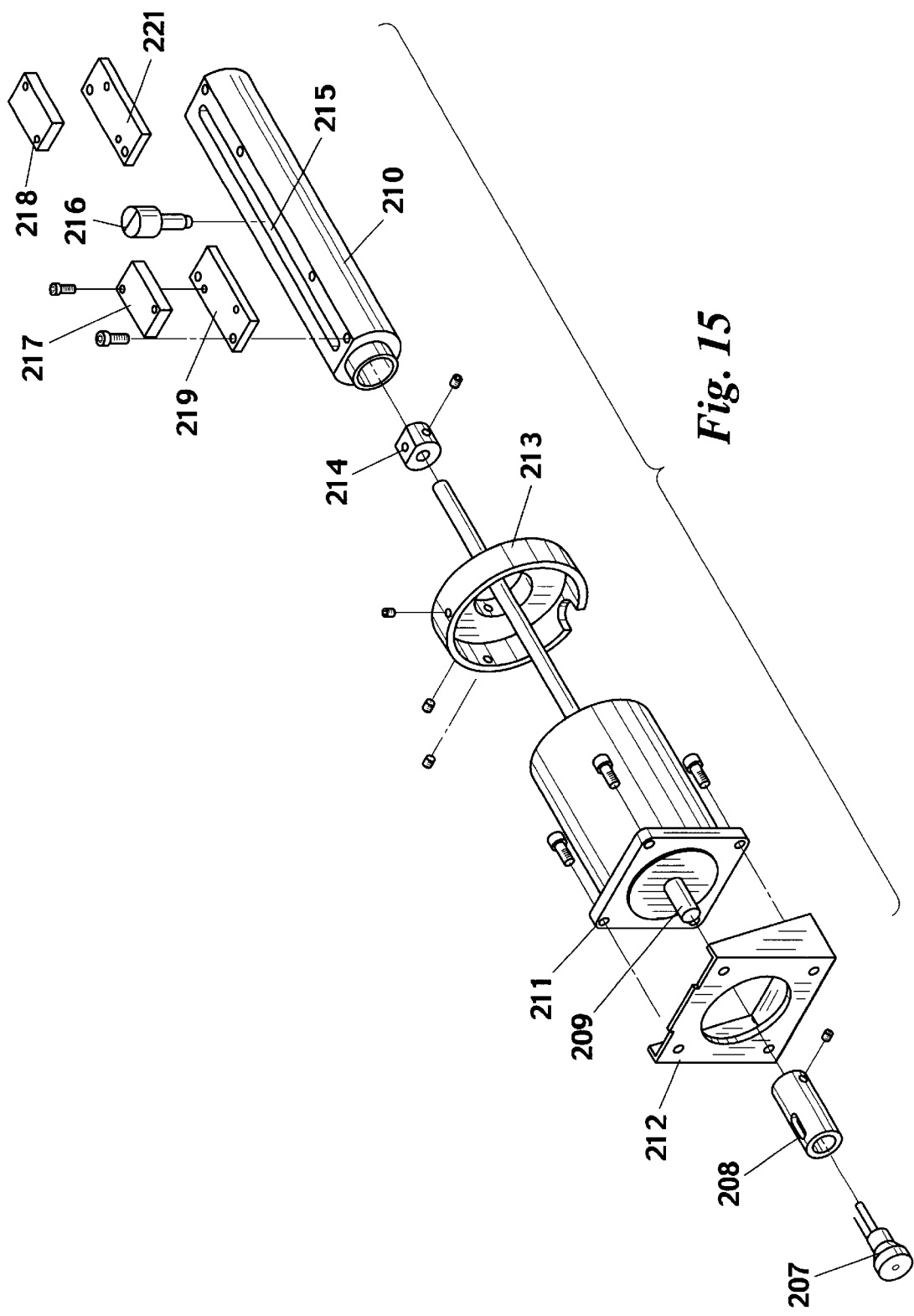
FIG. 15 is a perspective assembly view of a preferred embodiment of a coating tube pump for use with the coating tube of FIG. 14.

Turning to FIG. 12, the clean air supply assembly 170 has a solenoid valve 171 having an input connected by a bushing 172 to an input connector 173 which is mounted in the back of the machine for connection to a source of air under pressure (not shown). The solenoid valve output is connected through a bushing 174 and a T connector 175 to an air filter 176, preferably in a range of 0.2 microns. The filter is connected by an elbow 177 to a second T connector 178. One side 179 of the second T connector 178 is connected by a tube (not shown) to the up air nozzle 131 of the wash/dry basin 81 through the union 133 shown in FIG. 7. The other side 181 of the second T connector 178 is connected by a tube (not shown) to the second air nozzle 134 of the wash/dry basin 81 via the union 135 shown in FIG. 7. The operation of the solenoid 171 is controlled by the CPU 614 to activate and deactivate the clean air system 170. A pressure switch 182 connected to the first T connector 175 monitors the air pressure and is connected by cables 183 to the CPU 614 which stops the coating process if the air pressure is too low to dry the lens and indicates the air pressure as a problem on the control panel display screen 661.

The coating pump assembly 190 is illustrated in FIGS. 13, 14, 15 and 17. Looking at FIG. 13, the coating pump 191 has its output connected through a connector 192 and an elbow 193 to a three-way solenoid valve 194 having connectors 195 and 196 at its other two ports. A dose of coating is held in the pump chamber 197 and, when demand for coating is made, the coating pump piston drives the coating from the chamber 197 through the flow direction solenoid 194 and one of the connectors 195 to a coating filter 200 and a tube (not shown) to the coating nozzle 138 shown in FIG. 7. The CPU 614 causes the directional solenoid 194 to align with the coating nozzle 138 and simultaneously activates the coating pump 191 under control of one of the valves of the valve pack 232 when the horizontal intermediate reed switch 698 and the vertical down reed switch 74 are closed. A switch 712 on the hood 510 prevents operation of the coating pump assembly 190 when the hood 510 is open. When the coating distribution cycle is complete and the stepper motor 111 has operated for a predetermined number of steps, the CPU 614 causes the solenoid 194 to shuttle to connect the pump 191 to the solenoid 194 and the second connector 196 to a drain connector 198 in the coating basin reservoir 102 shown in FIG. 17. The coating pump piston reverses direction to draw coating out of the reservoir 102 of the coating basin 101 to store the necessary dosage of coating in the chamber 197 for the next coating cycle. The piston of the coating pump 191 is driven in the desired direction by air injected and/or released through connectors 199 and 201 to the pump 191 under the control of the coat side valve assembly 230 hereinafter discussed. The chamber 197 typically contains twenty-five milliliter doses of coating material. The original supply of coating material is contained in a coating tube 202 shown in FIG. 14. A piston (not shown) within the coating tube 202 drives coating through the tube eject port 203 through a tube (not shown) connecting the eject port 203 to the coating inlet aperture 140 in the coating basin 101 as shown in FIG. 7. A computer information pack 204 is attached by use of a double backed adhesive pad 205 to an information pack mount 206 which connects to the back of the piston (not shown) and travels with the piston (not shown) into the coating tube 202 as the quantity of coating stored in the tube 202 decreases. Data contained in the information pack 204 is read by a tactile touch probe 207 which is coupled by a probe mount 208 to the shaft 209 of a linear stepper motor 211 which is mounted on a motor bracket 212 connected to the frame of the machine. The other end of the shaft 209 extends through a shaft tube support 213 fixed to the motor 211 into a shaft tube 210 which extends longitudinally about the shaft 209. An actuator mount 214 fastened to the shaft 209 moves within the shaft tube 210 with the shaft 209 and below a longitudinal slot 215 on the upper wall of the shaft tube 210. A switch actuator 216 extends through the slot 215 and is connected to the actuator mount 214. A pair of limit 745 switches 217 and 218 are mounted on switch spacers 219 and 221, respectively, at opposite ends of the slot 215 and cooperate with the actuator 216 to determine the longitudinal position of the shaft 209 at maximum and minimum travel points. In operation, when the coating tube 202 is full, the probe 207 is in its fully retracted position and the actuator 216 cooperates with the rearmost limit switch 218 to signal the CPU 614 that the probe 207 is at its rearmost position and the tube 202 is full. As the unit dispenses coating into the coating basin 101, the stepper motor 211 operates to drive the shaft 209 forward and maintain engagement of the probe 207 with the information pack 204. A level sensor 713 in the coating basin 101 monitors the coating level and signals to the CPU 614 when the stepper motor 211 is to advance to drive the piston in the coating tube 202 to distribute additional coating into the coat basin 101. When demand is made, the stepper motor 211 will operate for a sufficient number of steps to inject the desired quantity of coating into the coat basin 101. If demand is made with failure to satisfy the requirement of the level sensor 713, the CPU 614 will indicate a failure on the display screen 661. When all of the coating has been ejected from the coating tube 202, the actuator 216 will cooperate with the forward limit switch 217 to indicate that the shaft 209 has reached its forward most position. When a predetermined number of injections have occurred, the CPU 614 causes the stepper motor to automatically return the shaft to its rearmost position with the actuator 216 cooperating with its rearmost limit switch 218. In this condition, the empty coating tube 202 can be removed and a new coating tube inserted. After insertion of the new tube 202, the operator will cause the machine to resume operation. In addition to cooperating with the limit switches 217 and 218, the actuator 216 also serves, by cooperation with the slot 215, to prevent the shaft 209 of the stepper motor 211 from rotating.

Figure 16:
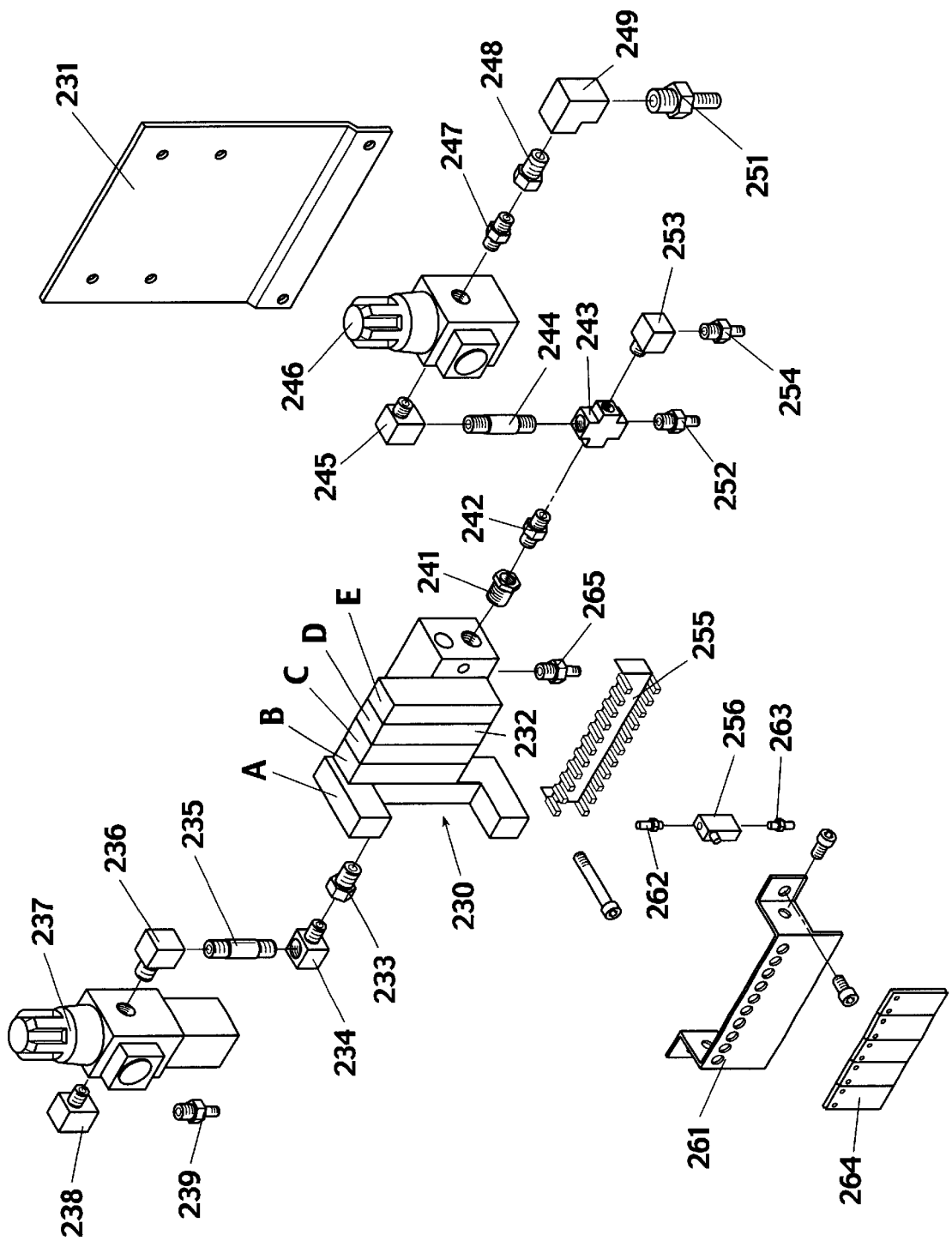
FIG. 16 is a perspective assembly view of a preferred embodiment of a coat side valve assembly for the lens coating machine.
Figure 17:
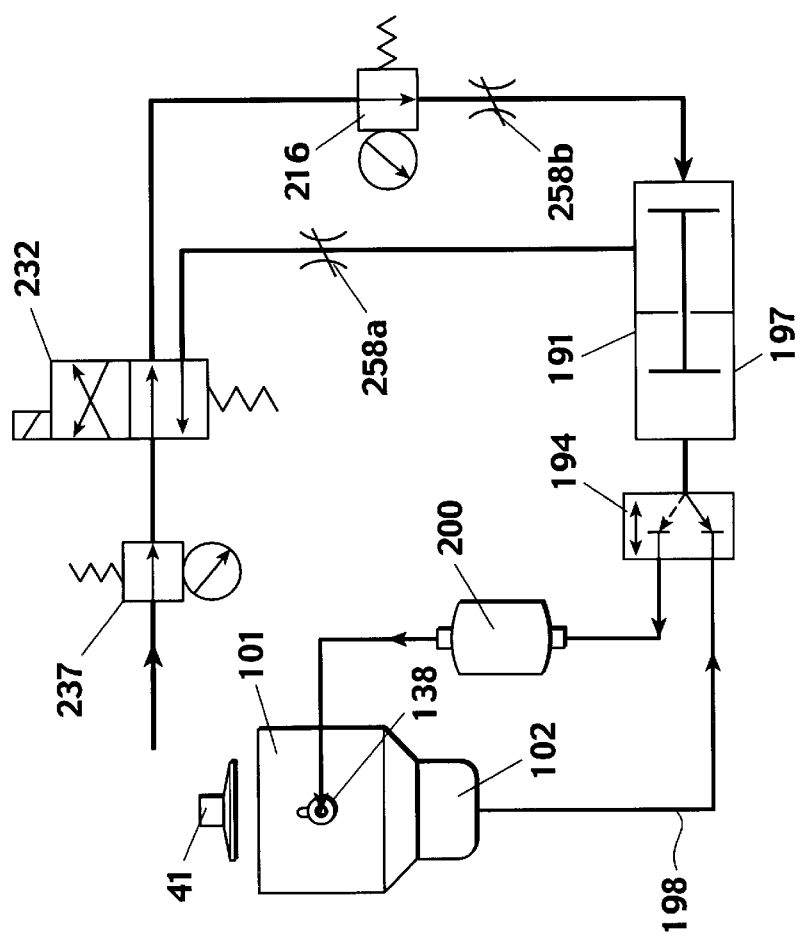
FIG. 17 is a schematic diagram of a preferred embodiment of the pneumatics of the coating pump of the lens coating machine.

The coat side valve assembly 230 shown in FIG. 16 includes a valve pack mount 231 to which the valve pack 232 is secured. The valve pack 232 includes five valves. One side of the valve pack 232 is connected through a bushing 233, an elbow 234, a nipple 235 and another elbow 236 to a filter regulator and gauge unit 237. The other side of the regulator 237 is connected through an elbow 238 to a hose connector 239. The other side of the valve pack 232 is connected through a bushing 241 and a nipple 242 to a cross 243. One side of the cross 243 is connected through a nipple 244 and an elbow 245 to a regulator with a gauge unit 246. The other side of the regulator 246 is connected through a nipple 247, bushing 248 and elbow 249 to a hose connection 251 which is connected to the input connector 163 to the water pump solenoid valve 162. A second leg of the cross 243 is connected to a hose connector 252 which is extended to the cure side air supply and the final leg of the cross 243 is connected through an elbow 253 to a hose connector 254 which is extended to the pilot valve fitting 165 of the water pump solenoid valve 162. A valve rack 255 mounted on the valve pack mount 231 supports a plurality of pairs of flow control valves 256, 257, 258, 259 and 260 (only one shown). The valves are held in place on the rack 255 by a retainer 261 which secures the valves and the rack 255 against the mount 231. Each pair of the valves is provided with inlet and outlet hose connectors 262 and 263, the first connectors 262 extending by hoses to the connectors 265 of the valve pack 232. A label 264 applied to the face of the retainer 261 identifies the function of each of the valves. The operation of the coat side valve assembly 230 will hereinafter be explained.

Figure 18:
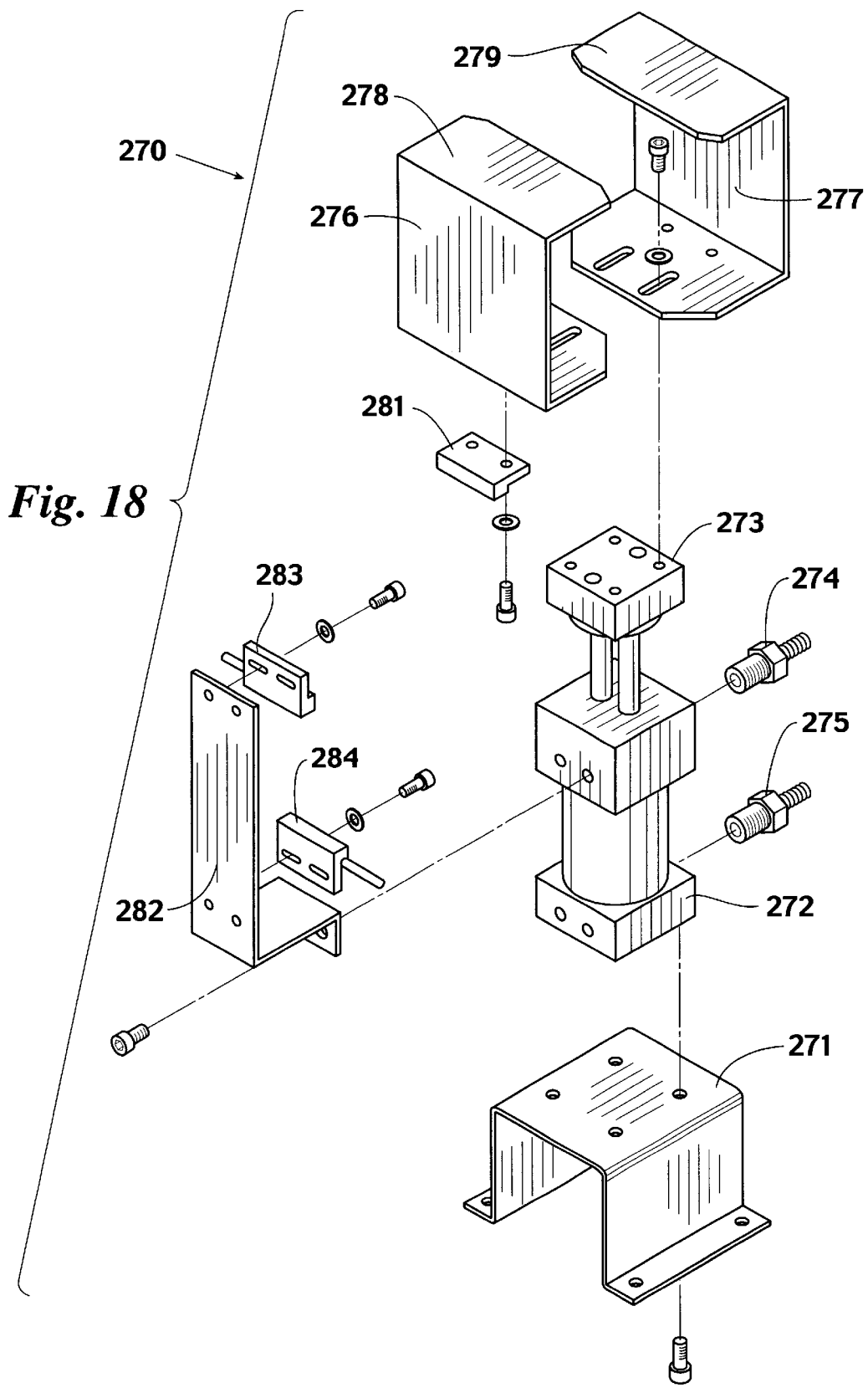
FIG. 18 is a perspective assembly view of a preferred embodiment of the pick-off assembly of the lens coating machine.

The pick-off station assembly 270 is illustrated in FIG. 18. A bracket 271 mounted on the frame of the machine supports a nonrotating lift cylinder 272 which reciprocates a lift platform 273 in response to the injection of air into upper 274 and lower 275 hose connectors on either side of the piston (not shown) in the cylinder 272. A pair of lens brackets 276 and 277, preferably opposed spaced apart U-shaped members, are fastened to the top of the lift platform 273 so that the upper horizontal flanges 278 and 279 are reciprocated with the platform 273. A switch magnet 281 is fastened to the bottom of one of the brackets 276. A switch bracket 282 secured to the machine frame supports a pair of reed switches 283 and 284 spaced apart at the upper and lower levels attained by the magnet 281 when the platform 273 attains its upper and lower limits of motion. In operation, the platform 273 is normally in its upmost position in which the flanges 278 and 279 will engage in the top groove 43 in the lens holder adapter 39 illustrated in FIG. 6. When the spin motor assembly 30 has reached the pick-off station assembly 270 so as to engage the adapter 39 in the flanges 278 and 279, the right side reed switch 699 signals the CPU 614 to operate the cylinder 272 downwardly to disengage the magnet 38 in the lens holder adapter 39 from the adapter 35 fixed to the shaft 36 of the spin motor 31 as shown in FIG. 5. Thus, the lens is de-chucked by the pick-off station assembly 270 and held for subsequent chucking for transmission to the cure side of the machine as will hereinafter be explained. When the lift platform 273 is in its lowermost position, the magnet 281 cooperates with the bottom reed switch 284 to signal the CPU 614 to return the spin motor assembly 30 to its position above the wash/dry basin assembly 80.

Figure 19:
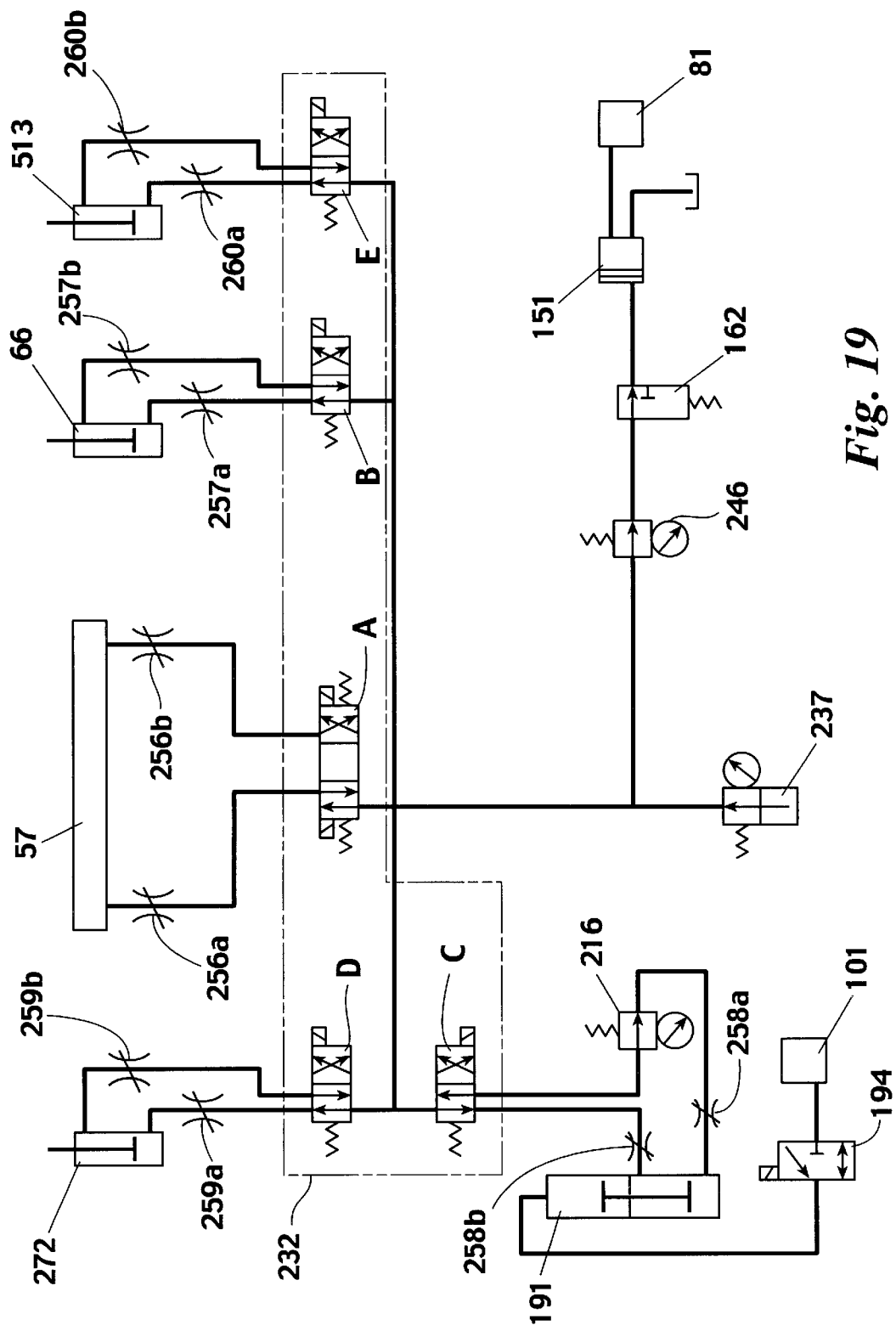
FIG. 19 is a diagram of a preferred embodiment of the pneumatics of the coat side components of the lens coating machine.

The operation of the coat side valve assembly 230 is illustrated in FIG. 19. The input air for the system is received through the filter regulator and gauge unit 237 and is delivered to the valves A, B, C, D and E of the valve pack 232. The air is then distributed through the first valve 232A to the rodless actuator 57 of the spin motor transport assembly 50 through control valves 256a and 256b to cause the right and left horizontal movement, respectively, of the spin motor 31. The second valve 232B serves the lift cylinder 66 of the spin motor transport assembly 50 through control valves 257a and 257b to cause the up and down movement, respectively, of the spin motor 31. The input air is also distributed from the third valve pack 232C to the coating pump 191 of the coating pump assembly 190. The operation of this portion of the pneumatic system is shown in greater detail in FIG. 17. The three-way solenoid valve 194 operates as earlier explained in relation to the coating pump 191. The regulator 237 regulates the operating pressure of the system at approximately 60 psi to supply the valve pack 232. Another regulator 216 regulates the pressure applied to the pump 191 through the control valve 258b to approximately 35 psi. The input through the other control valve 258a to the pump 191 which retracts the piston cam operates at system pressure because the pressure is not critical to the coating process. The fourth valve 232D also distributes air to control valves 259a and 259b to operate the nonrotating lift cylinder 272 of the pick-off station assembly 270. The fifth valve 232E distributes air through control valves 260a and 260b to open and close the access door 513 of the machine. Finally, air from the input filter regulator and gauge unit 237 is distributed through the regulator 246 to the wash pump solenoid valve 162 which in turn causes the operation of the water pump 151 of the wash pump assembly 150.

Figure 20:
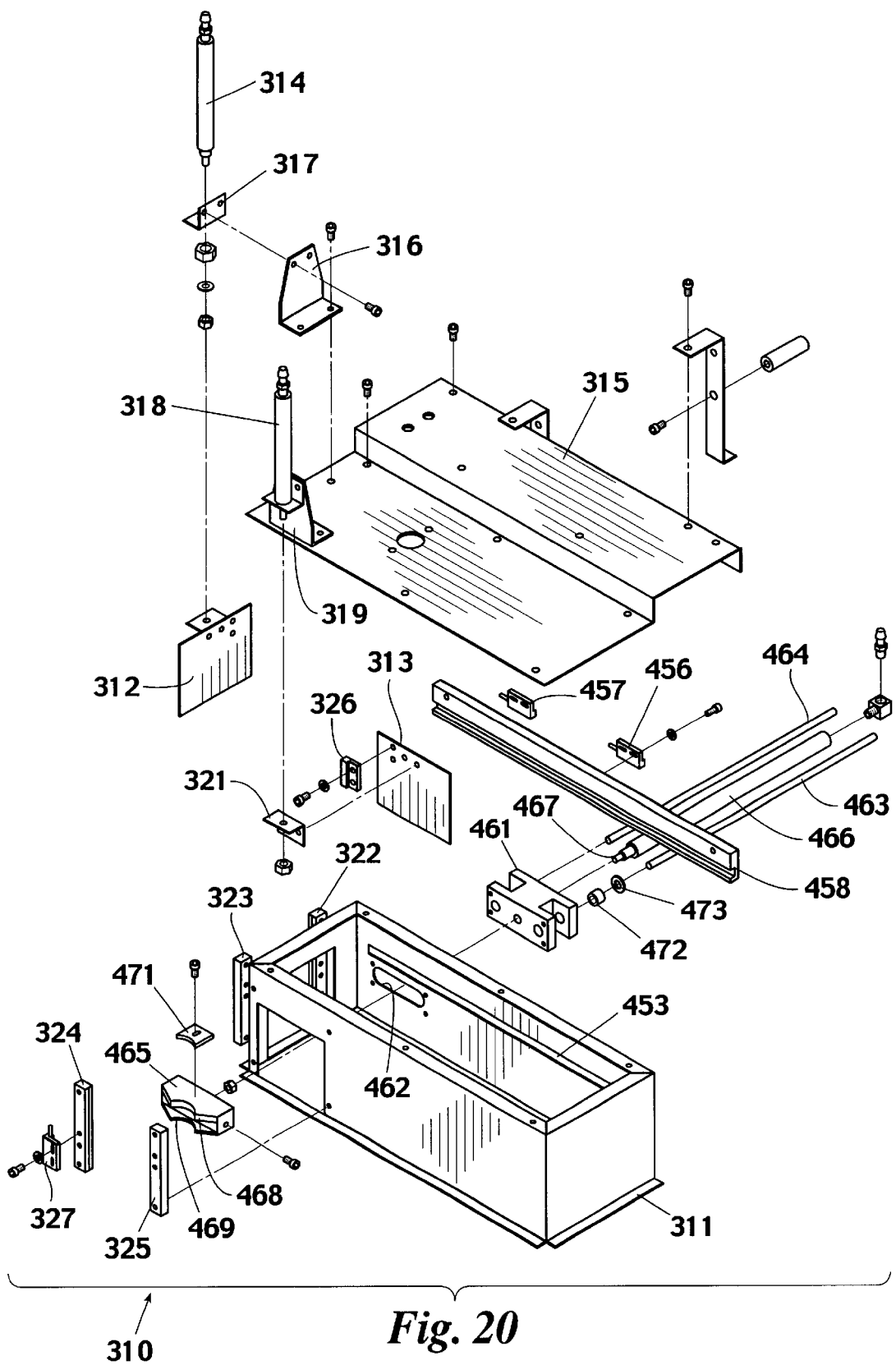
FIG. 20 is a perspective assembly view of a preferred embodiment of the upper chamber of the cure oven of the lens coating machine.

The upper chamber 310 of the curing oven 300 is illustrated in FIG. 20. A rectangular lens chamber 311 has an inlet door 312 and an outlet door 313 which slide vertically to open and close passageways in adjoining walls proximate one corner of the lens chamber 311. The inlet door 312 is operated by an air cylinder 314 which is mounted on the lens chamber top 315 by use of a cylinder bracket 316 and a cylinder mount 317. The outlet door 313 is operated by a second air cylinder 318 which is also mounted on the lens chamber top 315 by use of a second bracket 319 and mount 321. The inlet and outlet doors 312 and 313 slide within door guides 322 and 323 and 324 and 325, respectively. A magnet 326 is fastened to each of the doors 312 and 313 and reed switches 327 and 328 are fastened to one of the door guides 322 and 324 of each door. The reed switches 327 and 328 signal to the CPU 614 that the doors 312 and 313 are closed to assure that the lens chamber 311 is exposed to an ultraviolet source only when both doors 312 and 313 are closed.

Figure 21:
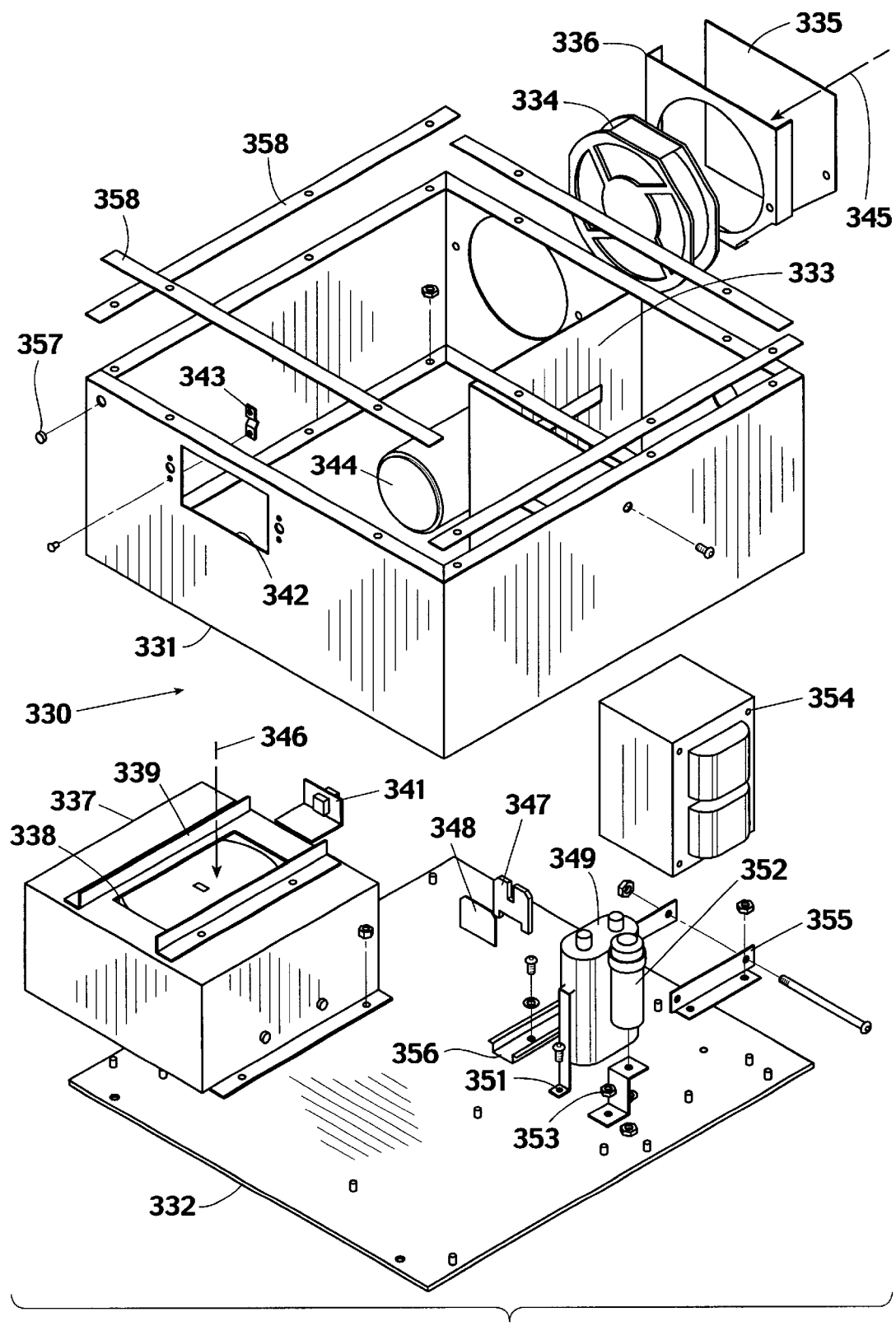
FIG. 21 is a perspective assembly view of a preferred embodiment of the lower chamber of the cure oven of the lens coating machine.
Figure 25:
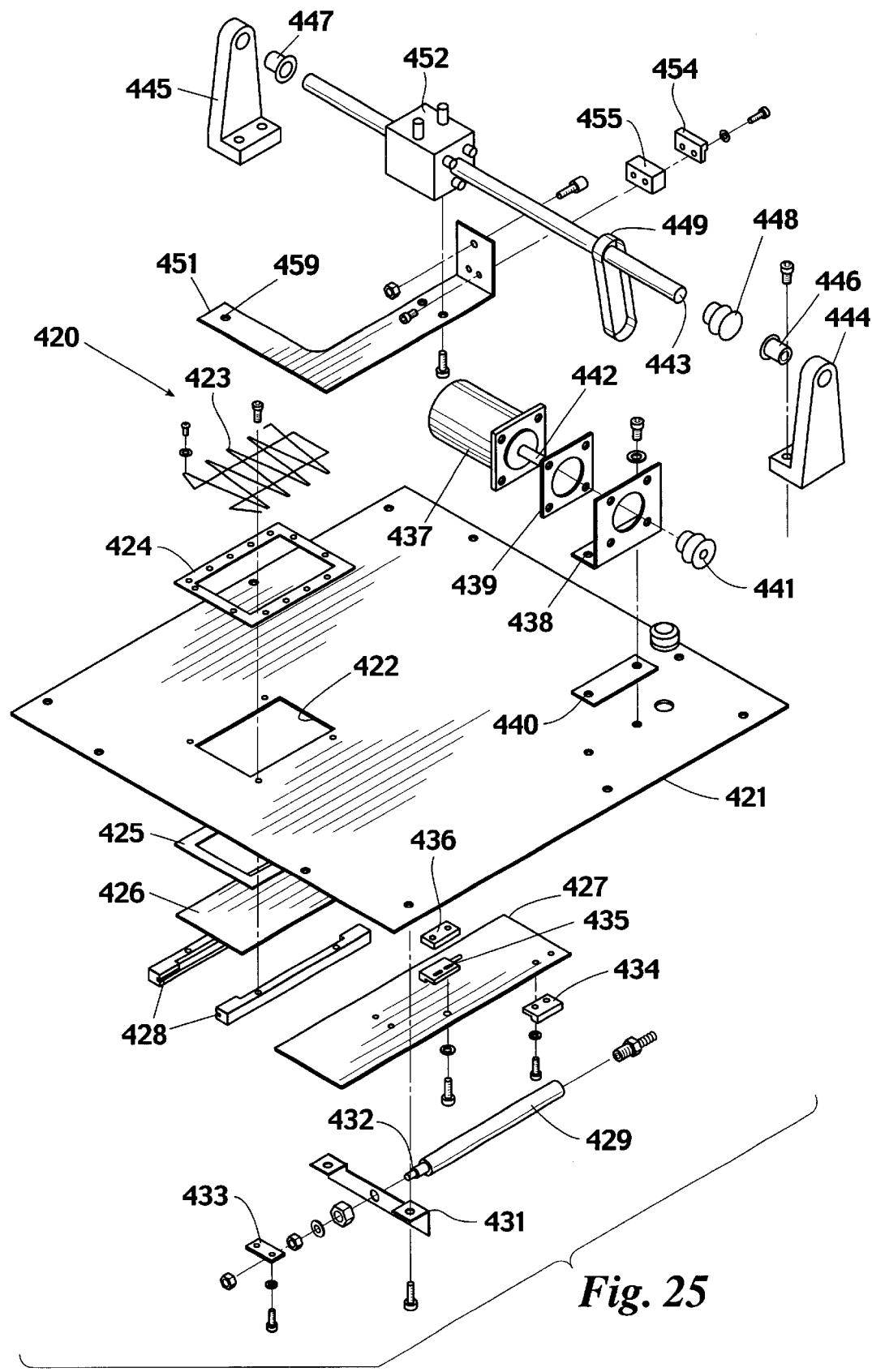
FIG. 25 is a perspective assembly view of a preferred embodiment of a pick-off arm assembly of the ultraviolet curing oven of the lens coating machine.
Figure 33A:
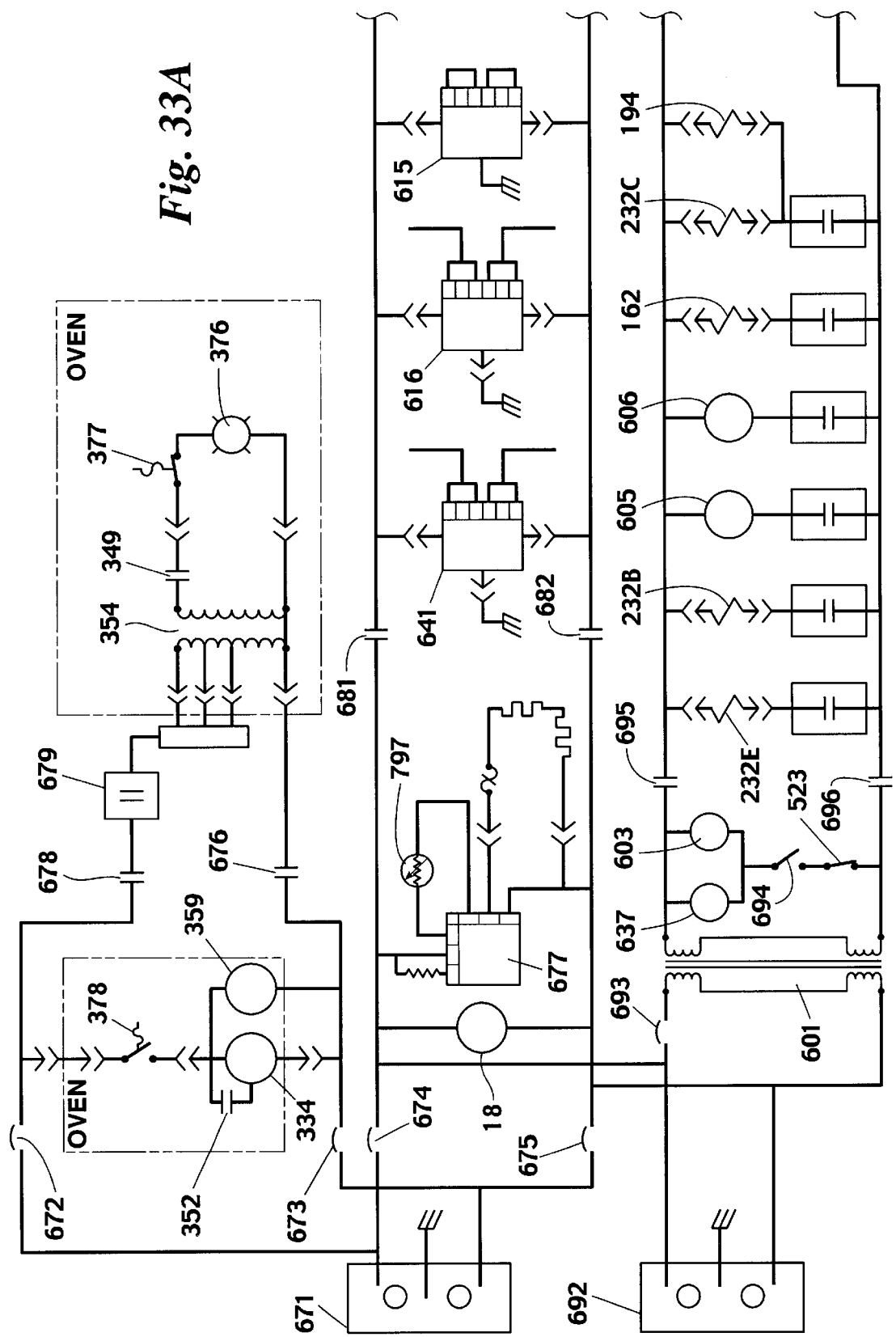
FIGS. 33A and 33B are an A.C. electrical layout diagram of the lens coating machine.
Figure 33B:
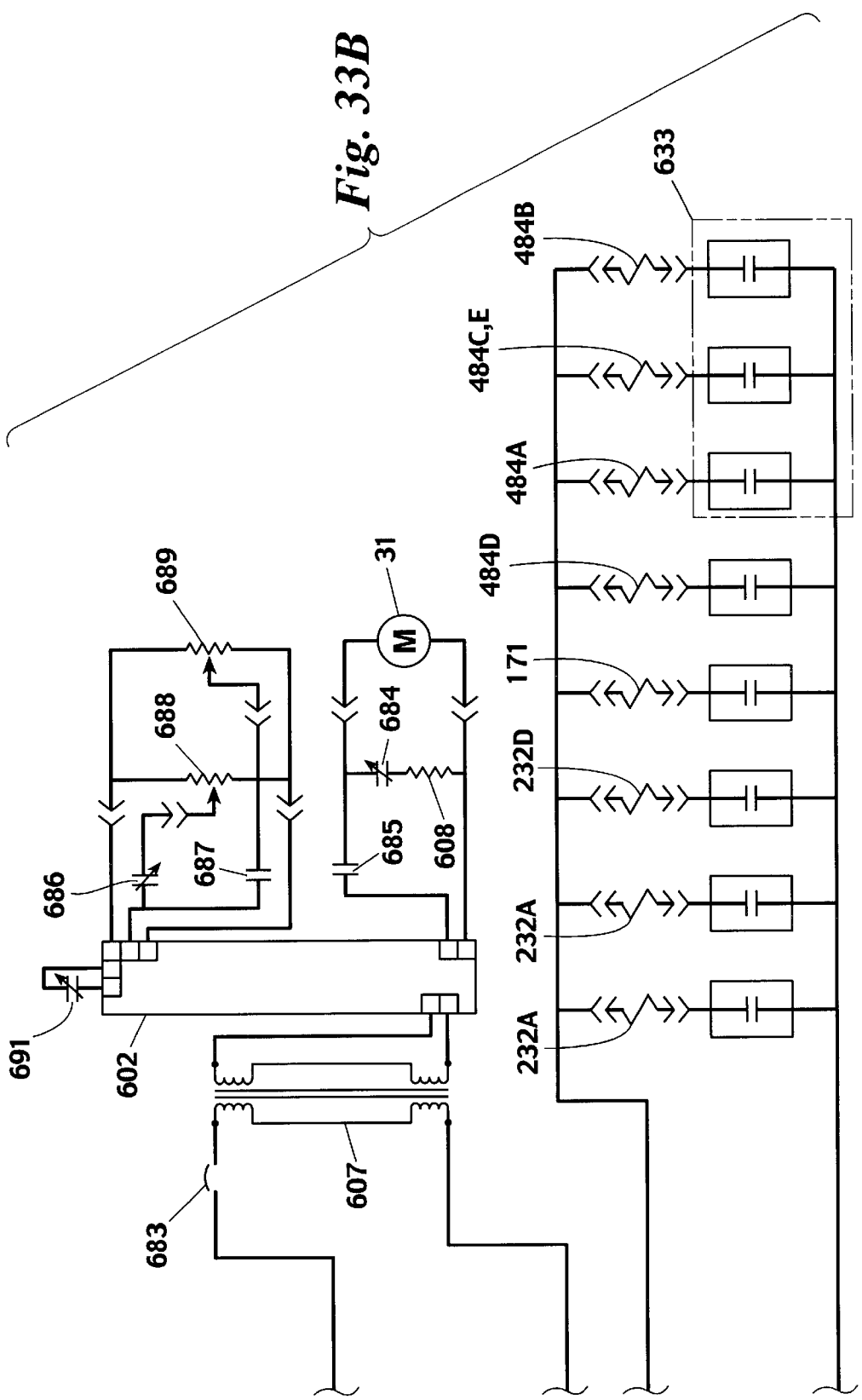

The upper chamber 310 is seated on top of a cover plate 421 shown in FIG. 25 of the lower chamber 330 which is illustrated in FIG. 21. A rectangular housing 331 is supported on a base plate 332. The rear right corner of the housing is divided into a separate compartment by an electrical component shield 333. A fan 334 mounted on the outer face of the left side rear wall draws input air to the lower chamber through a fan guard 335 and a filter pad holder 336. A cooling fan assembly 337 mounted on the base 332 in the front left corner of the housing 331 has a horizontal air flow opening 338 in its top wall with a pair of angle irons 339 extending from front to rear of the top of the assembly 337 on either side of the opening 338. A bracket 341 extends rearwardly and upwardly from the top of the cooling fan assembly 337 between the angle irons 339. A rectangular opening 342 is provided in the upper front wall of the housing 331 above the cooling fan assembly 337 and between the angle irons 339. A pair of spring catches 343 are mounted on the inside of the front wall of the housing 331 on either side of the rectangular opening 342. An exhaust tube 344 extends from the back of the cooling fan assembly 337 through the rear wall of the housing 331. Thus, the cooling fan 334 draws external air into the housing 331 along the inlet path 345 toward the rectangular opening 342 where it enters the cooling fan assembly 337 along a downward path 346 through the air flow opening 338 and then into the exhaust tube 344 which directs it out of the housing 331. Terminal blocks 347 (only one shown) and a terminal end cap 348 for the electrical connection of the fans 334 and 359 and the ballast 354 as shown in FIG. 33 are mounted on a rail 356 fastened to the base plate 332 below the inlet of the fan 334 into the housing 331. The electrical compartment defined by the shield 333 contains a first capacitor 349 mounted to the base 332 by a pair of brackets 351 and a second capacitor 352 mounted to the base 332 on a bracket 353. A ballast 354 is mounted on the base 332 by a pair of brackets 355. The operation of the electrical system will hereinafter be explained. A green LED lens 357 is provided in the upper left hand corner of the front face of the housing 331. The upper edges of the housing 331 are aligned with gaskets 358 to support the cover plate 421 of the lower chamber 330.

Figure 22:
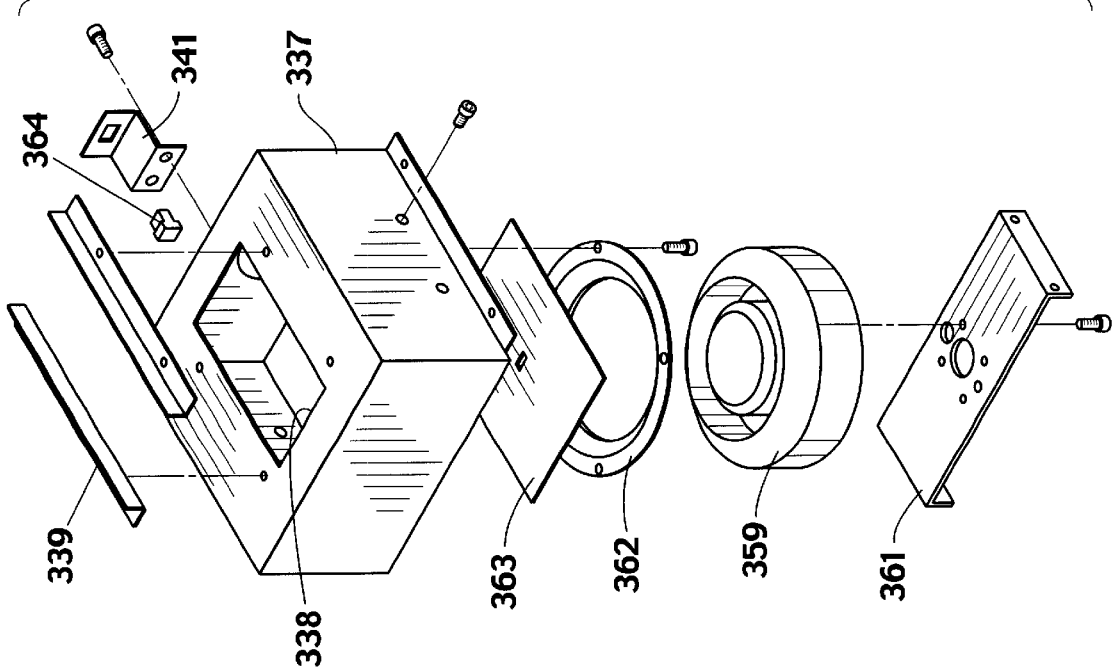
FIG. 22 is a perspective assembly view of a preferred embodiment of a cooling fan assembly of the lower chamber of FIG. 21.
Figure 23:
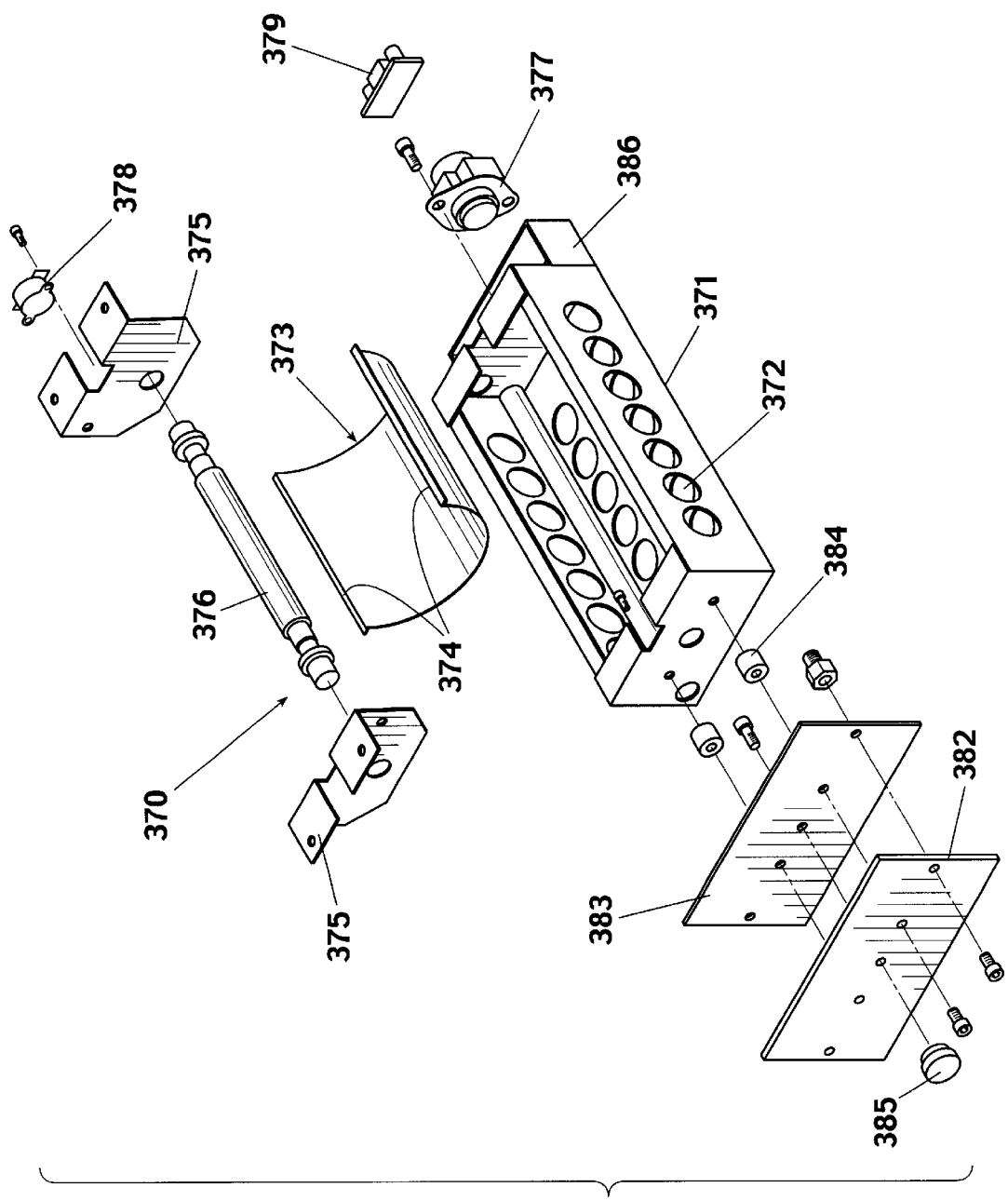
FIG. 23 is a perspective assembly view of a preferred embodiment of the ultraviolet bulb enclosure of the cure oven of the lens coating machine.

The ultraviolet source 370 is shown in FIG. 23. A bulb housing weldment 371 has a base and side walls with a plurality of apertures 372. A substantially parabolic reflector 373 is seated in the weldment 371 in concave position with the upper edges of the reflector 373 having flanges 374 seated on the upper edges of the weldment 371. Preferably, the lower portion of the reflector 373 is parabolic and the side walls of the reflector 373 are more elliptical. A pair of bulb brackets 375 fastened to the front and rear walls of the weldment 371 support the ultraviolet bulb 376 in longitudinal alignment within the reflector 373. A thermostat disk 378 fastened to the outer back wall of the weldment 371 controls the operation of the cooling fan 334 in the lower chamber 330 of the oven so that the fan 334 will not turn on until after the bulb 376 has warmed up typically at approximately 120 degrees F., and will not shut off until after the bulb 376 has cooled down, also to approximately 120 degrees F. A second thermostat disk 377 fastened to the back of the bulb bracket 375 in front of the back of the weldment 371 functions as a safety disconnect if the first thermostat disk 378 fails to function and disconnects the ultraviolet bulb 376 at approximately 250 degrees F. A connector 379 is mounted on the back of a lower rear extension 381 of the weldment 371. A rectangular front face 382 backed by a gasket 383 is fastened to the front of the weldment 371 in spaced apart relationship established by standoffs 384. A knob 385 fastened to the front of the front face 382 permits the operator to insert and withdraw the ultraviolet bulb enclosure 370 into and from the rectangular aperture 342 in the front wall of the lower chamber 330. With the enclosure 370 fully inserted, the gasket 383 seals the opening 342 and assures the flow of cooling air through the enclosure 370. As shown in FIG. 22, the interior of the cooling fan assembly 337 houses a muffin fan 359 which is mounted on a bracket 361 fastened to the side walls of the assembly 337. A fan ring 362 seated on top of the fan 359 is covered by a fan guard 363. The fan 359 draws the flow of air downwardly through the air flow opening 338 in the top of the assembly 337. A connector 364 is mounted in the upwardly extending potion of the bracket 341 for bringing el grial power to the lamp 376. Preferably, the connector 364 has a self-aligning capability to assure proper connection when the bulb enclosure 370 is inserted into the lower chamber 330.

Figure 24:
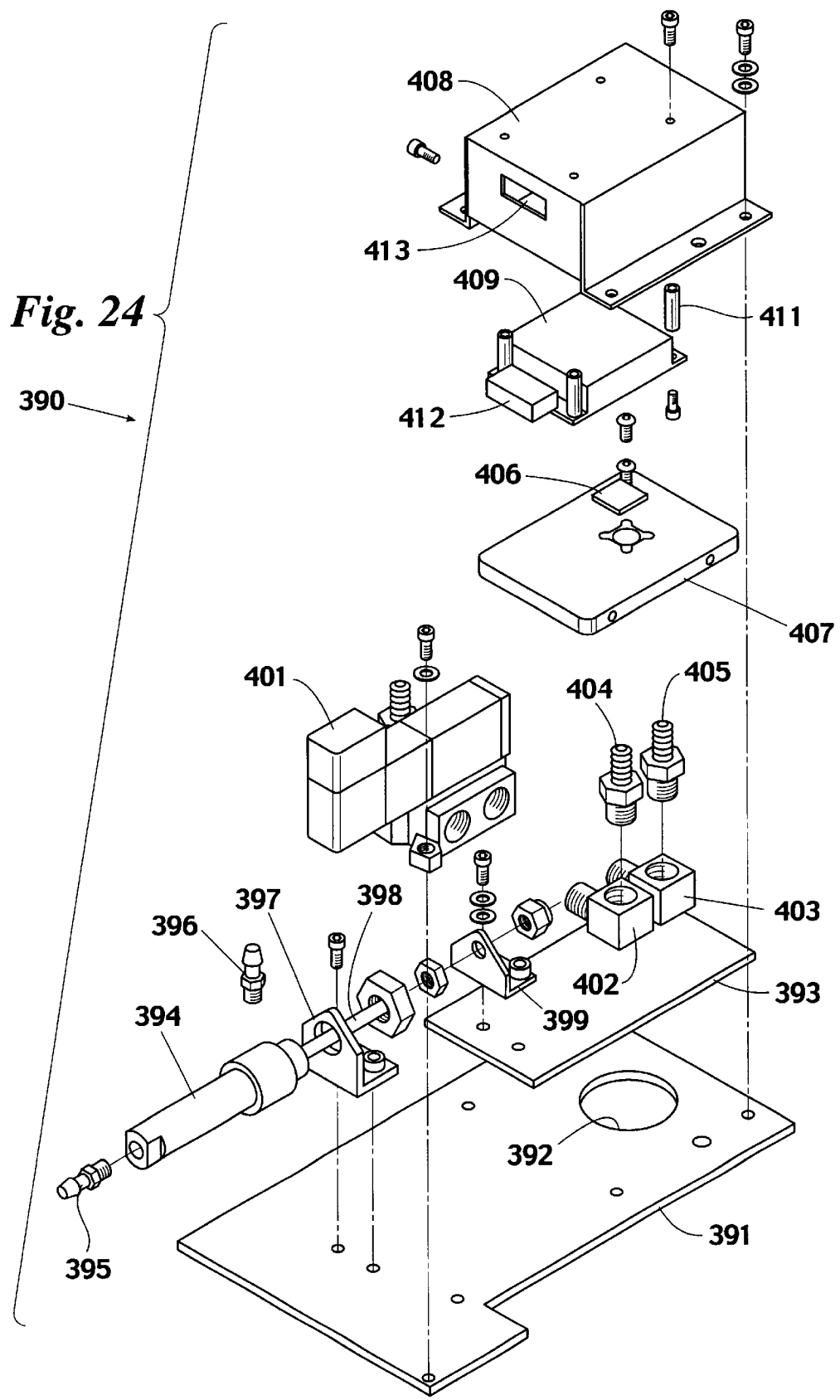
FIG. 24 is a perspective assembly view of a preferred embodiment of the ultraviolet sensor of the cure oven of the lens coating machine.

The ultraviolet sensor assembly 390 is illustrated in FIG. 24. A mounting plate 391 with an aperture 392 through it is fastened on top of the upper chamber 310 of the oven 300. A sensor shutter 393 slidably positioned over the aperture 392 is reciprocated by an air cylinder 394 having its piston (not shown) driven by air injected into either end of the cylinder 394 through hose connectors 395 and 396. The cylinder 394 is mounted on the plate 391 by a mounting bracket 397 and the shaft 398 of the cylinder 394 is connected to the shutter 393 by means of another bracket 399. The operation of the cylinder 394 is controlled by tho CPU 614 by use of the solenoid valve 401. The air flow ports of the valve 401 are connected by elbows 402 and 403 and hose connectors 404 and 405 to the connectors 395 and 396 of the cylinder 394 through hoses (not shown). A sensor filter 406 mounted on a filter holder 407 is mounted within a sensor box 408. The ultraviolet sensor 409 is suspended within the box 408 above the filter 406 by use of spacers 411. The sensor connector 412 extends outside of the box 408 through an aperture 413 in its sidewall. When the shutter 393 is opened, the sensor 409 detects the ultraviolet energy level and the CPU 614 will not permit the operator to start the process if the level is less than a predetermined threshold established in the information pack 204.

The pickoff arm assembly 420 is shown in FIG. 25. The assembly 420 is mounted on the cover plate 421 of the lower chamber 330. The plate 421 is seated on the gaskets 358 on top of the lower chamber 330 and a rectangular aperture 422 is aligned above the ultraviolet bulb 376. The aperture 422 is covered by a wire grid 423 mounted on a frame 424. The underside of the aperture 422 is surrounded by a gasket 425 and a quartz lens 426 is mounted against the gasket 425. The wire grid 423 shields against a lens dropping through the aperture 422 onto the quartz lens 426. A shutter 427 is reciprocated beneath the quartz lens 426 on a pair of shutter guides 428 in response to the operation of an air cylinder 429 which is mounted to the underside of the cover 421 on a mounting bracket 431. The rod 432 of the cylinder 429 is connected to the shutter 427 by another bracket 433. A magnet 4S4 mounted on the shutter 427 cooperates with a reed switch 435 mounted with a spacer 436 against the underside of the cover plate 421 to signal the status of the shutter 427 to the CPU 614. The upper chamber 310 of the oven 300 is mounted on the front portion of the cover plate 421 as can best be seen in FIG. 3. The pick-off arm assembly 420 is mounted on the back of the cover plate 421 behind the upper chamber 310. A stepper motor 437 is mounted on the cover plate 421 by use of a bracket 438 with a gasket 439 between the bracket 438 and the mounting plate of the motor 437. A gasket 440 is also provided between the bracket 438 and the cover plate 421. A timing pulley 441 is connected to the shaft 442 of the motor 437. A long shaft 443 is journalled between two bearing brackets 444 and 445 mounted on the cover plate 421. The long shaft 443 is journalled to the brackets 444 and 445 by bearings 446 and 447. A second timing pulley 448 fixed proximate one end of the long shaft 443 is coupled to the motor shaft timing pulley 441 by a timing belt 449. The L-shaped lens pick-off arm 451 is fixed to a linear actuator 452 which is in turn engaged on the long shaft 443 to reciprocate axially along the long shaft 443 as the long shaft 443 is rotated. Looking at FIGS. 20 and 25, the pick-off arm 451 extends into the upper chamber 311 through an elongated slot 453 in the back wall of the upper chamber 311 and the free end of the arm 451 extend to be reciprocated through the opening covered by the entry door 312. As shown in FIG. 25, a magnet 454 mounted on the pick-off arm 451 with a spacer 455 cooperates with a home reed switch 456 and a limit switch 457 mounted on a cam follower bearing guide 468 to signal the position of the pick-off arm 451 to the CPU 614. When the CPU 614 is determining whether the stepper motor 437 is at its reference home position which occurs when the home reed switch 456 cooperates with the magnet 454, the reed switch 456 signals this condition to the CPU 614. The pick-off arm 451 continues to move from the reference home position to its actual home position in response to a predetermined offset controlled by the software of the CPU 614. At this home position, the lens center 459 of the pick-off arm 451 will be centered at the intersection of the axes centered on and transverse to the inlet and outlet doors 312 and 313 of the upper chamber 310. When the limit switch 457 cooperates with the magnet 456, the CPU 614 causes the travel of the pick-off arm 451 to be terminated. Thus, when a lens has been dechucked from the spin motor assembly 30 by the pick-off station assembly 270 and is held between the flanges 278 of the lens brackets 276 at the pick-off station 270, the pick-off arm 451 is extended out of the upper chamber 310 by the motor 437 until the lens center 459 of the pick-off arm 451 is centered above the magnet 38 of the lens adapter 39. The CPU 614 then causes the pick-off station assembly 270 to be raised to engage the magnet 38 with the pick-off arm 451, The pie-off arm 451 is then withdrawn into the upper chamber 310, disengaging the lens from the annular groove 44 in the lens holder adapter 39. Looking again at FIG. 20, when the lens which has been magnetically chucked to the pick-off arm 451 has been cured, it is ejected through the opening covered by the outlet door 313 of the upper chamber 310. To accomplish this, a mount 461 secured to the back wall of the upper chamber 310 over a horizontal aperture 462 centered on the transverse center axis of the outlet door 313 and below the elongated slot 453 through which the pick-off arm 451 go extends. The mount 461 guides a pair of horizontally spaced apart shafts 463 and 464 which are fixed at their front end to a push off member 465. The shafts 463 and 464 slide in bearings 472 secured in place in the mount 461 by snap rings 473. An air cylinder 466 mounted to the mount 461 has a rod 467 which extends through the mount 461 and connects at its free end to the push off 465. Thus, reciprocation of the cylinder rod 467 causes the push off 465 to be reciprocated in a path transverse to the path of reciprocation of the pick-off arm 451. The front of the pick-off 465 is provided with upper and lower tongues 468 and 469. The lower tongue 468 engages with the bottom groove 44 in the lens holder adapter 39 and the upper tongue 468 engages with top of the adapter 39 to extend the adapter 39 and the lens through the opening at the outlet door 313 for collection by the operator. A magnet catch 471 fixed to the top of the push off 465 cooperates with the magnet 38 of the adapter 39 to assist in holding the adapter 39 in the push off 465. The CPU 614 automatically causes the push off 465 to be operated after the pick-off arm 451 has returned to home position by use of the valve pack 484.

Figure 26:
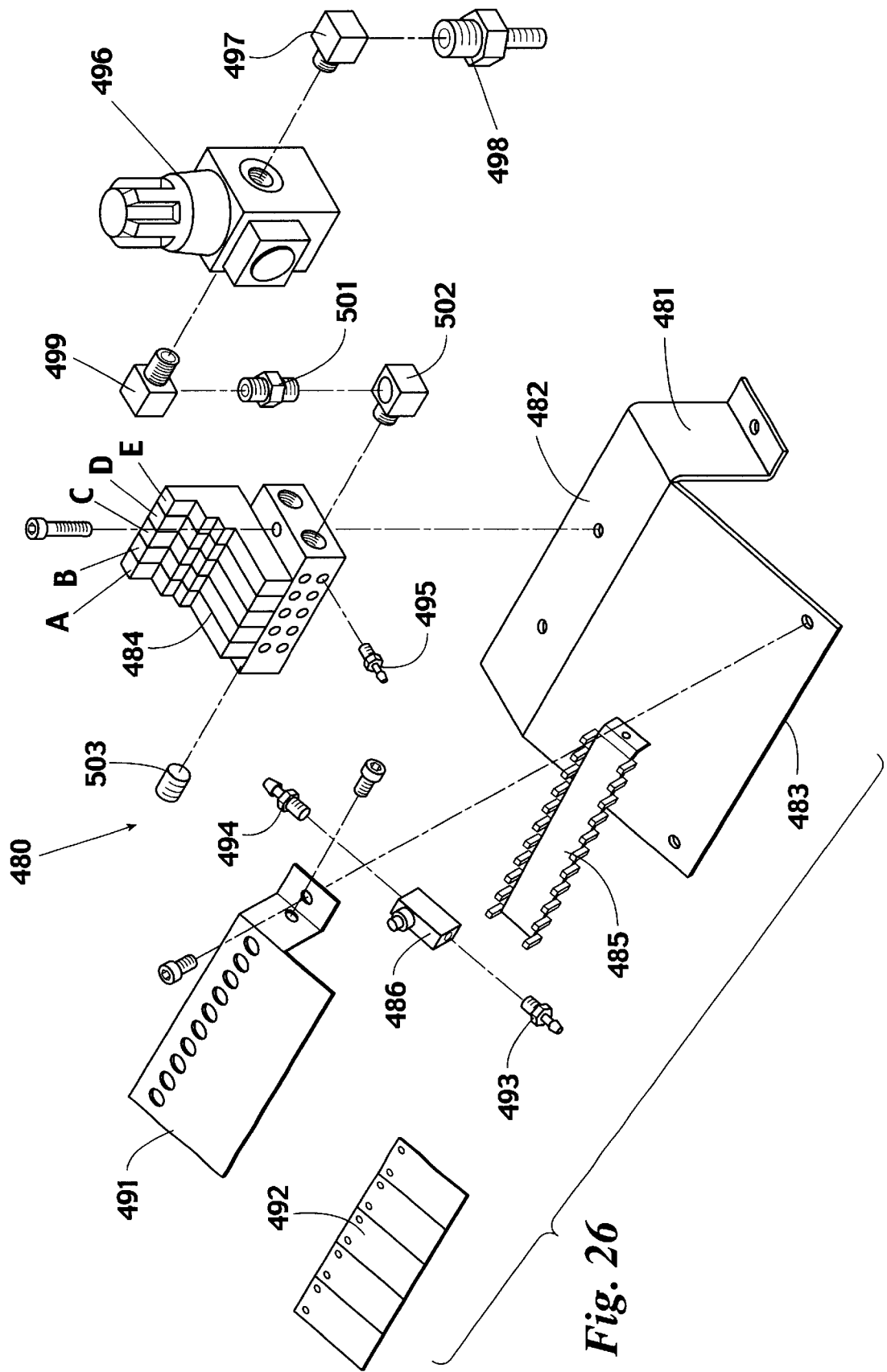
FIG. 26 is a perspective assembly view of a preferred embodiment of the cure side valve assembly of the lens coating machine.
Figure 27:
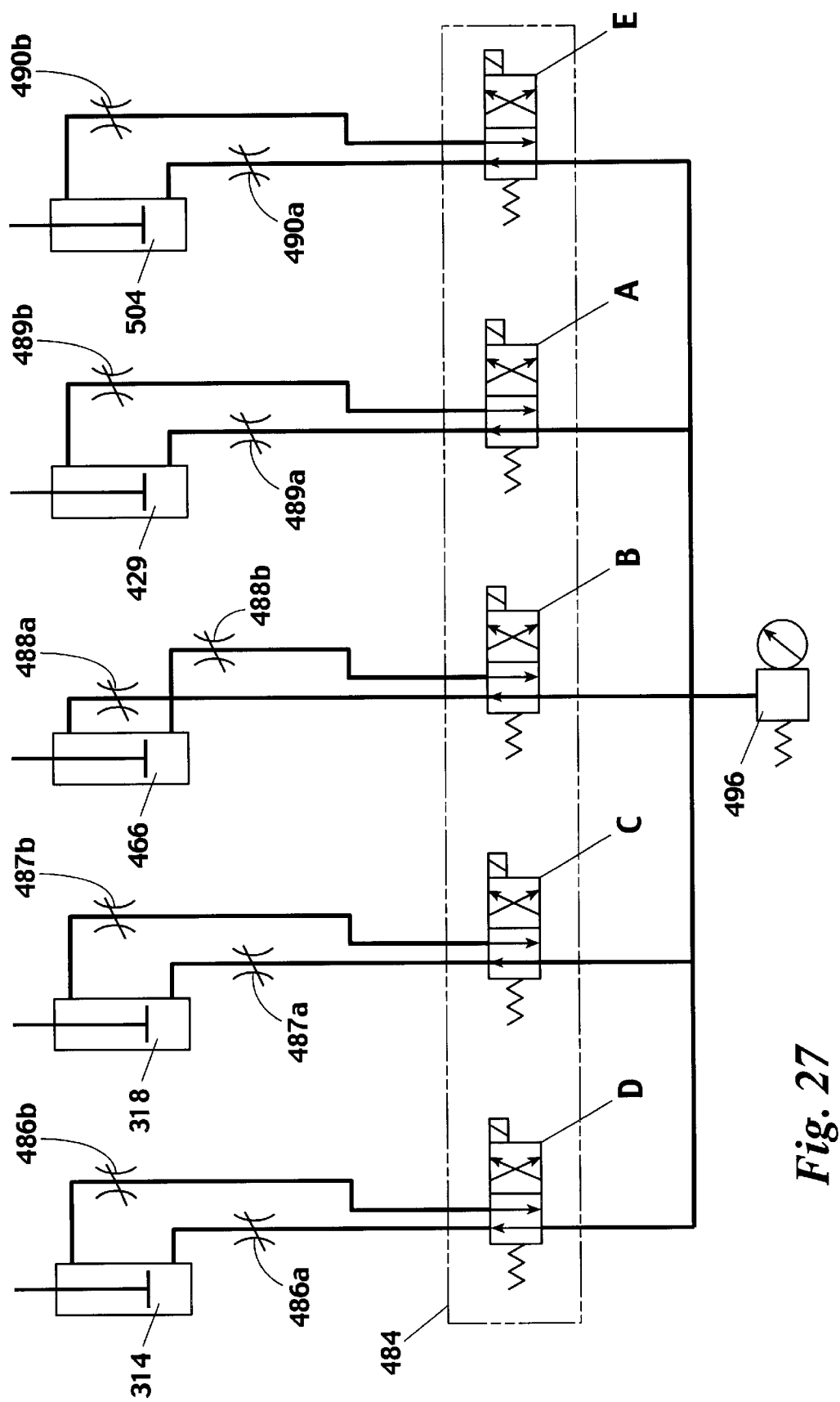
FIG. 27 is a schematic diagram of a preferred embodiment of the pneumatics of the cure side components of the lens coating machine.

The cure side valve assembly 480 is illustrated in FIGS. 26 and 27. A mounting bracket 481 has an elevated front platform 482 and a tilted rear platform 483 extending downwardly from the front platform 482. A valve pack 484 is mounted on the front platform 482 and a valve rack 485 supporting five pairs of flow control valves 486, 487, 488, 489 and 490 (only one shown) is secured to the rear platform 483 by a valve retainer 491. A label 492 disposed on the valve retainer 491 indicates the components served by the respective flow control valves. Each of the flow control valves is provided with a pair of hose connectors 493 and 494 and the valve pack 484 is provided with hose connectors 495 for connection of the pneumatic system. Air pressure in the system is controlled by a regulator with gauge unit 496 with its input connected through an elbow 497 to a hose connector 498 which is extended by a hose (not shown) to the connector 252 of the valve pack 230 shown in FIG. 16 and its output connected through an elbow 499, a nipple 501 and another elbow 502 to the valve pack 484. A plug 503 is also provided to close the air passage of the valve pack. Looking at FIG. 27, from the regulator 496 air is distributed through the valve pack 484 to each of the pairs of control valves 486, 487, 488, 489 and 490. The first control valves 486a and 486b cooperate with the solenoid valve 484D to cause the up and down strokes of the inlet door cylinder 314 of the inlet door 312 of the upper chamber 310. The second flow control valves 487a and 487b cooperate with the solenoid valve 484C to cause the up and down stroke of the outlet door cylinder 318 of the outlet door 313 of the upper chamber 310. The third flow control valves 488a and 488b cooperate with a third solenoid valve 484B to cause the rearward and forward strokes of the push-off cylinder 466 of the upper chamber 310. The fourth flow control valves 489a and 489b cooperate with a fourth solenoid valve 484A to cause the opening and closing strokes of the cylinder 429 of the shutter 427 associated with the ultraviolet bulb 376. The fifth flow control valves 490a and 490b cooperate with the fifth solenoid valve 484E to cause the up and down stroke of the air cylinder 504 which reciprocates the discharge door 505 in front of the outlet door 313 of the upper chamber 310 as seen in FIG. 1.

Figure 28:
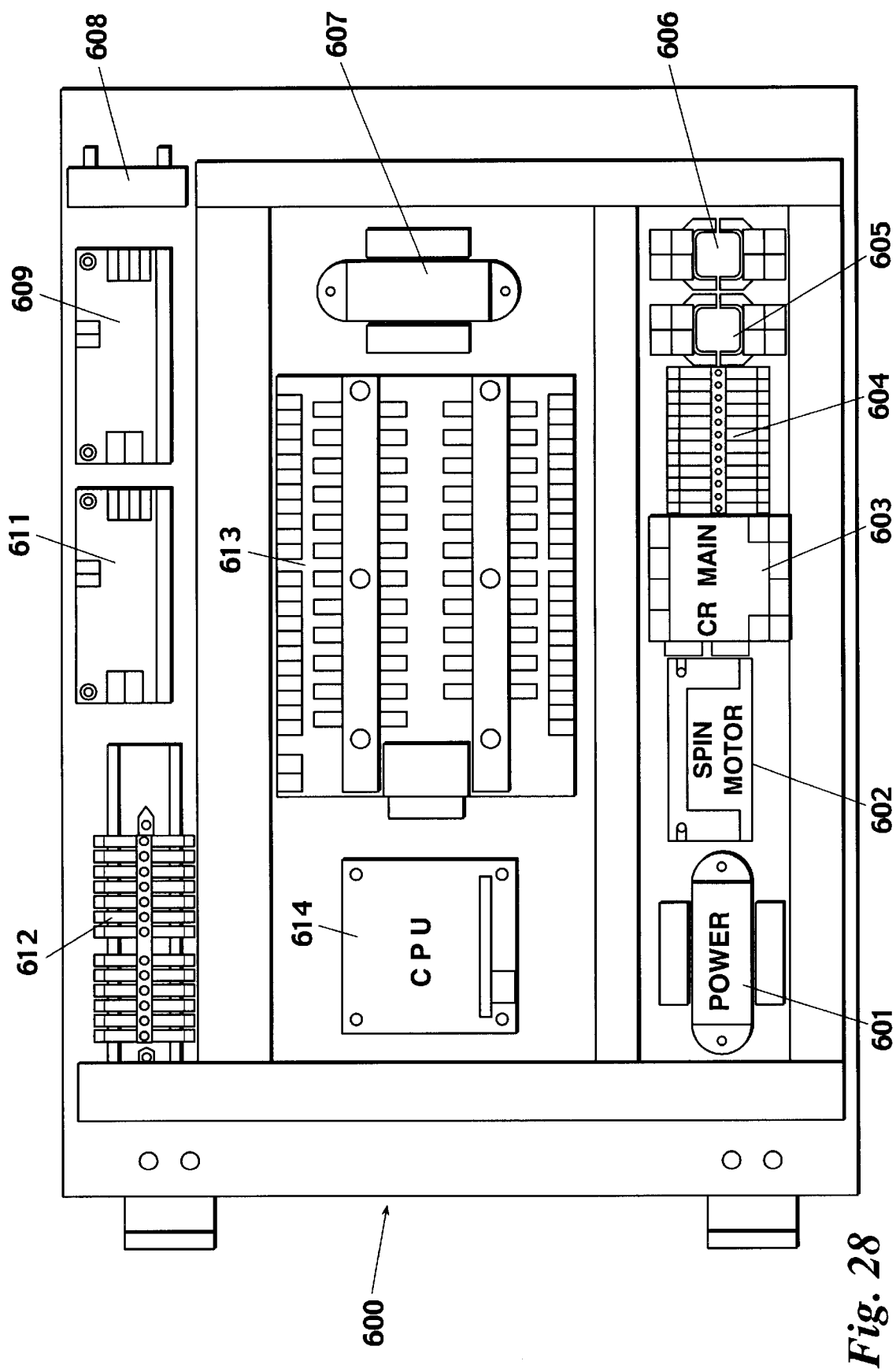
FIG. 28 an elevation view of a preferred embodiment of the front of the coat side electrical panel of the lens coating machine.
Figure 29:
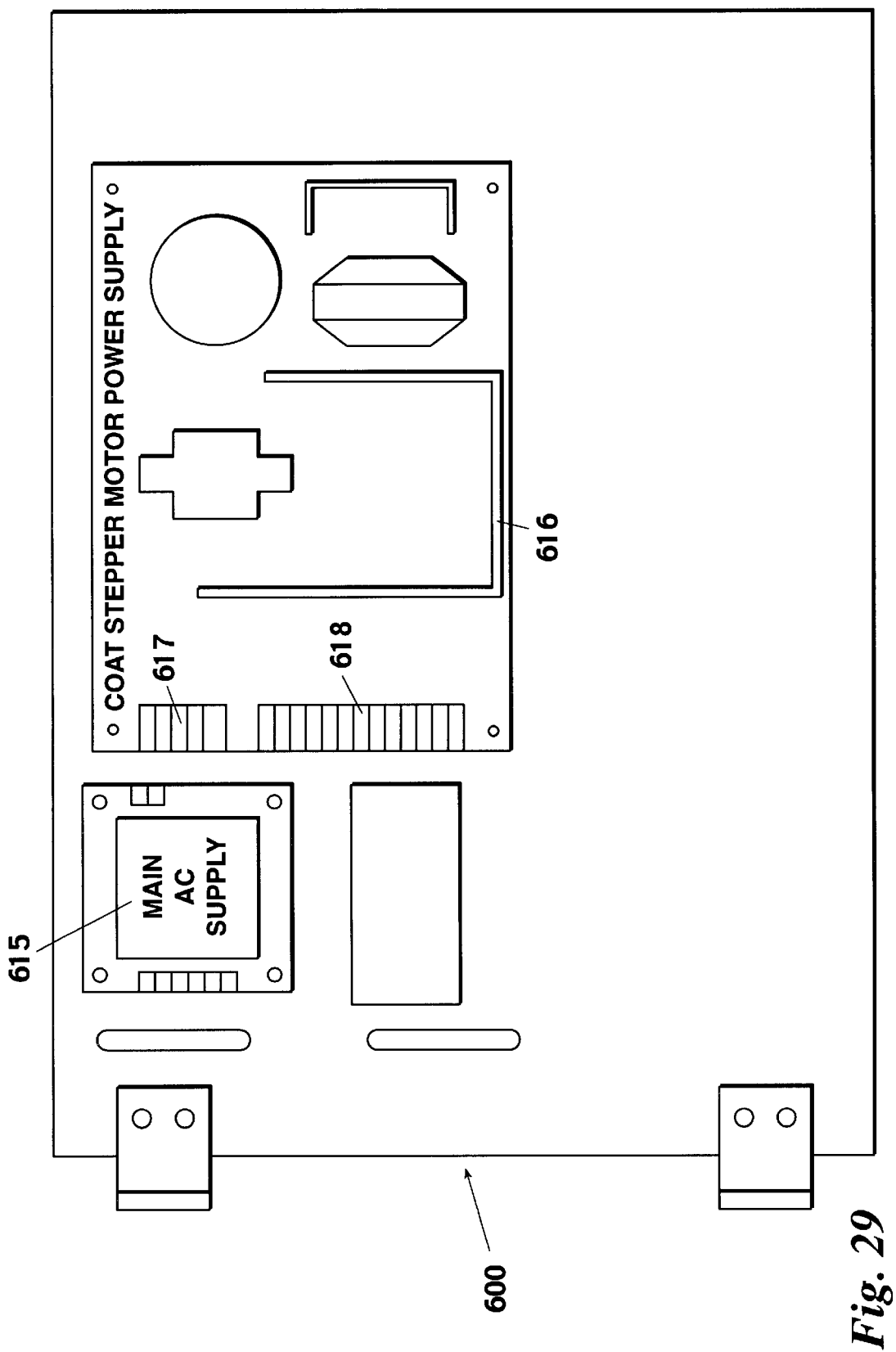
FIG. 29 an elevation view of the rear of the panel of FIG. 28.

The coat side electrical panel 600 is illustrated in FIGS. 28 and 29. The panel 600 contains a main power transformer 601, a spin motor drive board 602, a main power relay 603, AC terminal blocks 604, a spin motor power relay 605, a spin motor speed relay 606 and a spin motor transformer 607. A resistor 608 is provided as a dynamic brake for the spin motor 31. A drive board 609 is provided for the information pack 204 and another drive board 611 provided for the cam/nozzle assembly 110. DC terminal blocks 612 and a coat input/output board 613 are provided. The panel 600 also contains the CPU 614 consisting of three stacked boards for controlling the coat and cure side electrical components. As shown in FIG. 29, the back of the coat side electrical panel 600 contains the main power supply 615 and the coat side stepper motor power supply 616 including AC in and DC out terminal blocks 617 and 618, respectively.

Figure 30:
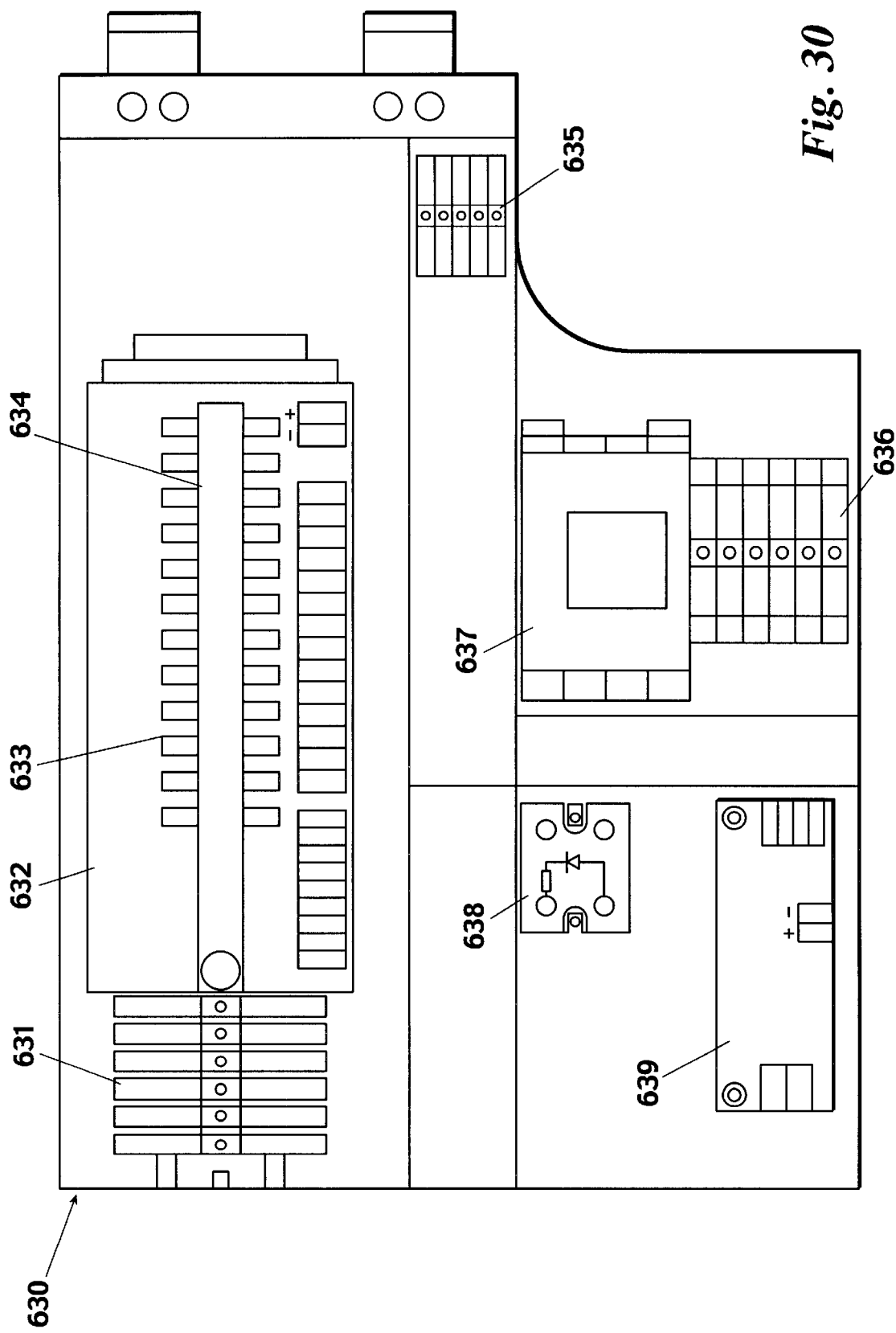
FIG. 30 an elevation view of a preferred embodiment of the front of the cure side electrical panel of the lens coating machine.
Figure 31:
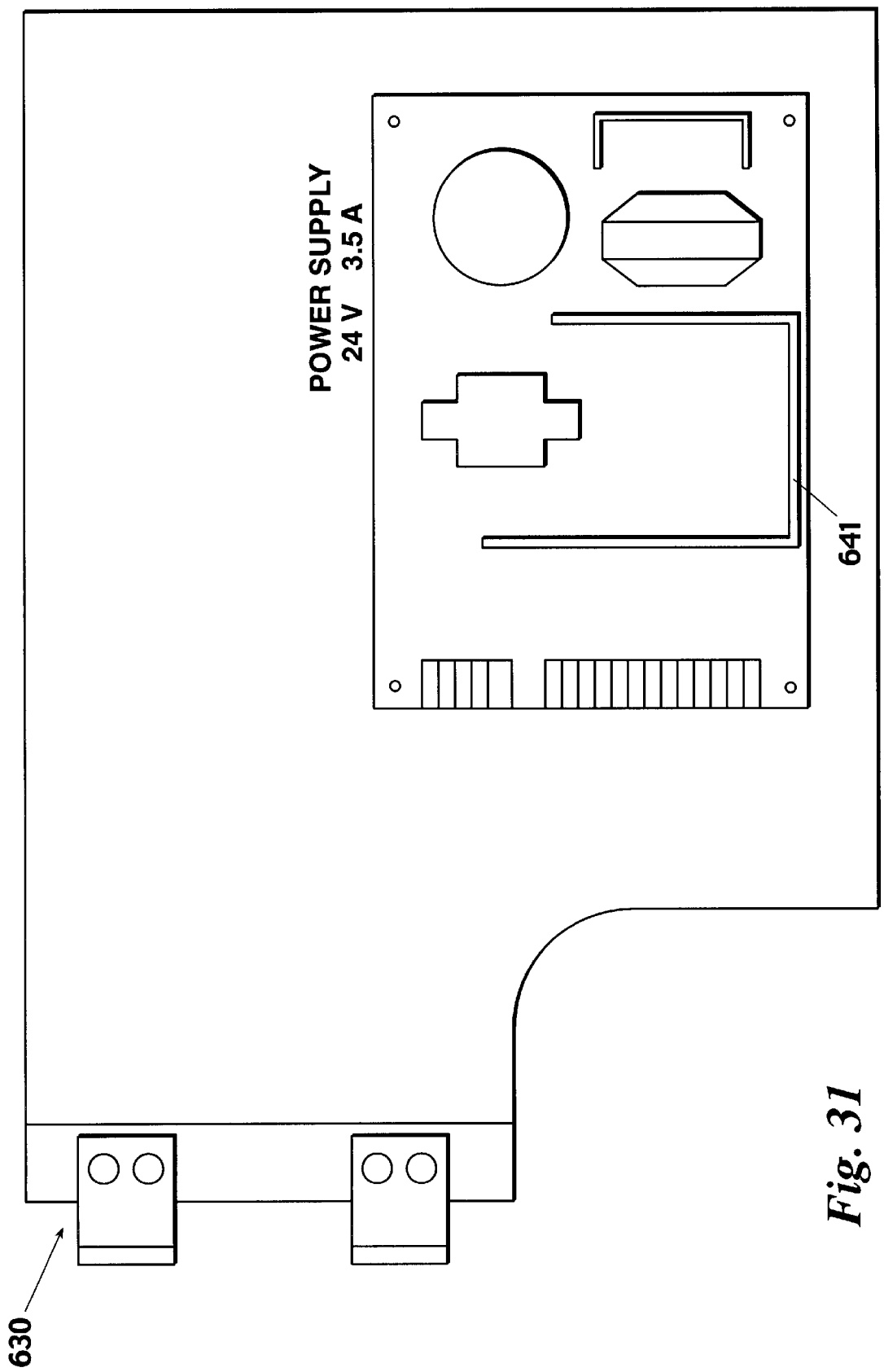
FIG. 31 an elevation view of the rear of the panel of FIG. 30.
Figure 32A:
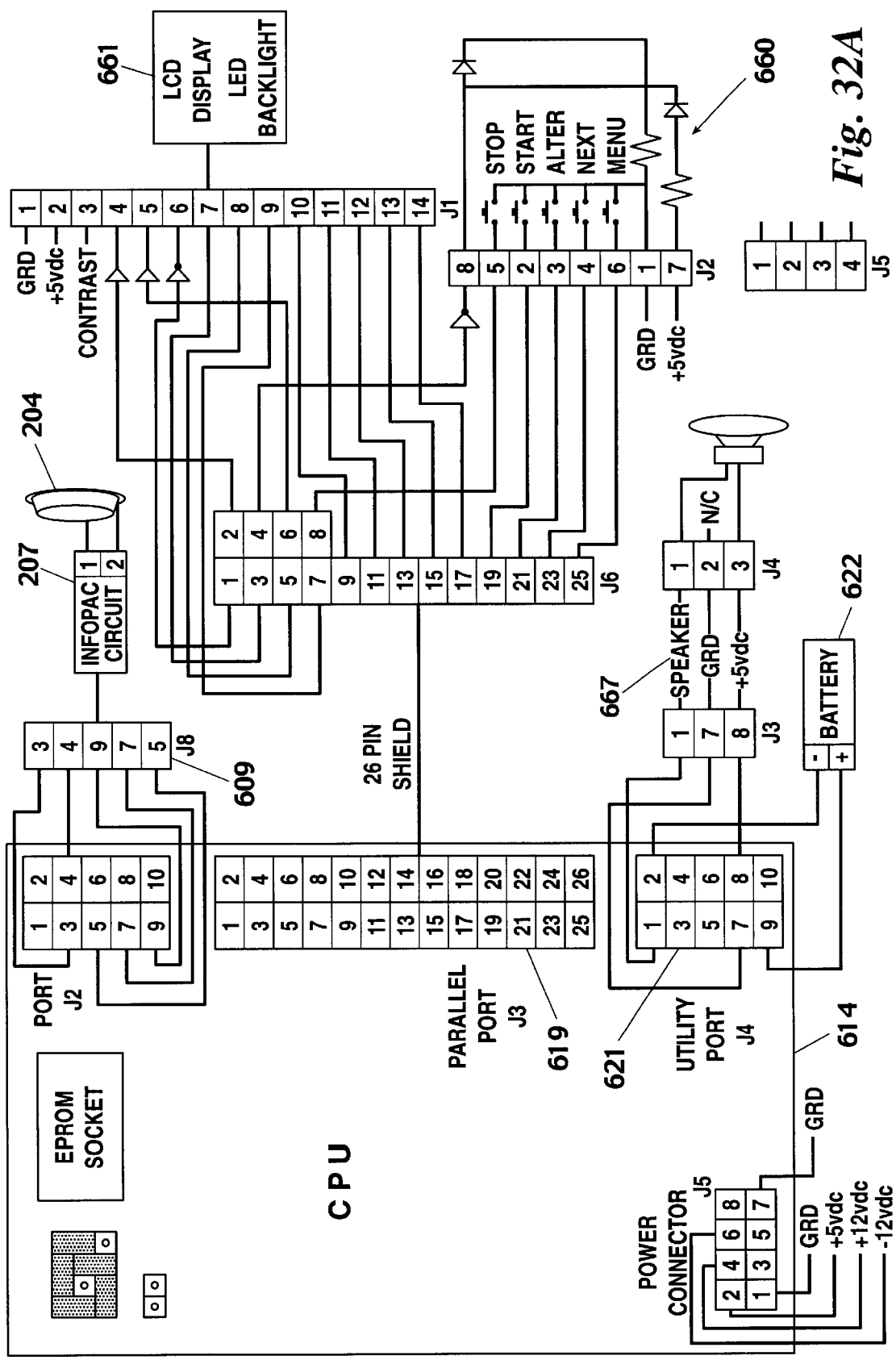
FIGS. 32A, 32B, 32C and 32D are an electrical interconnect diagram of the lens coating machine.
Figure 32B:
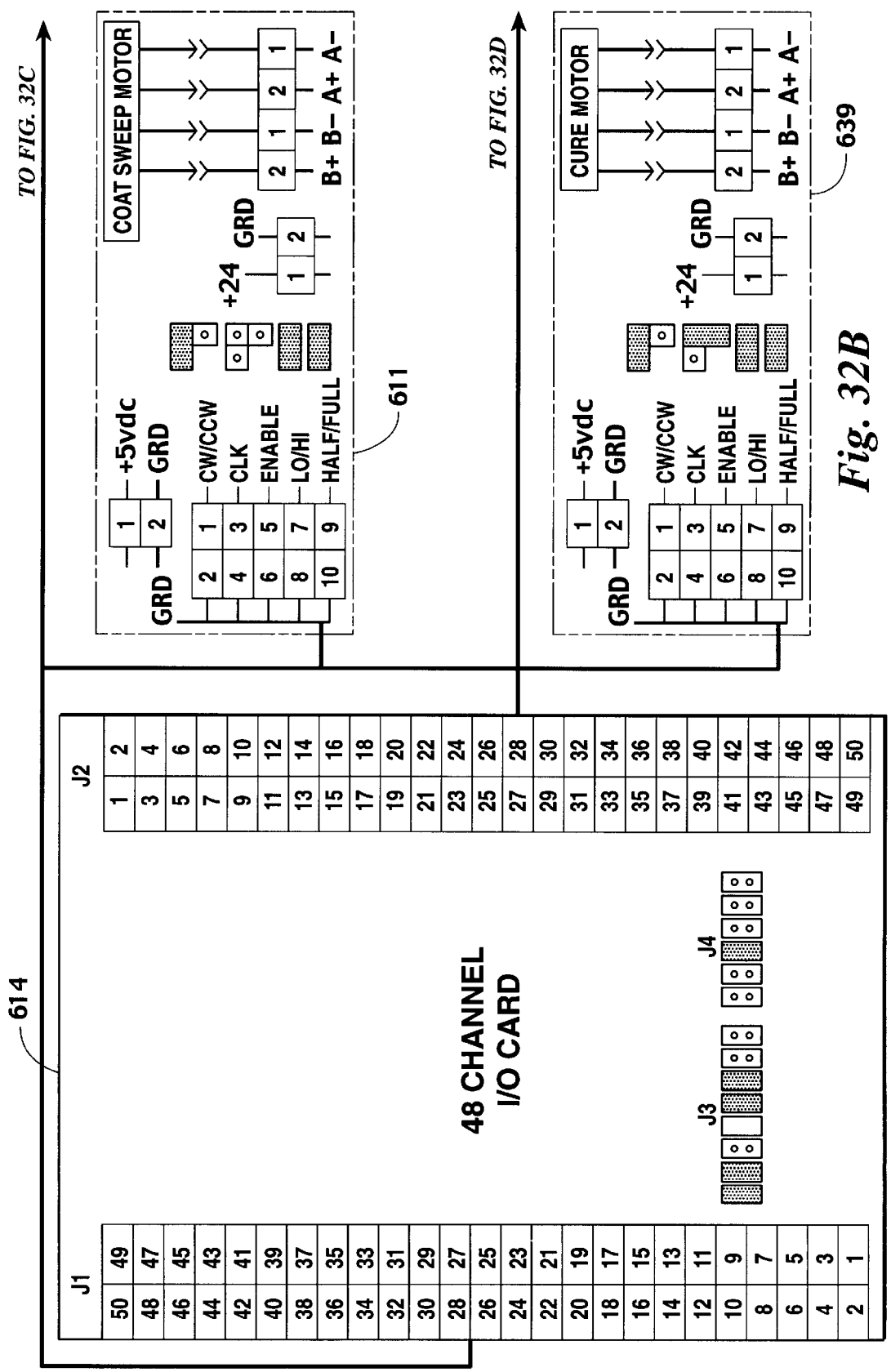
Figure 32C:
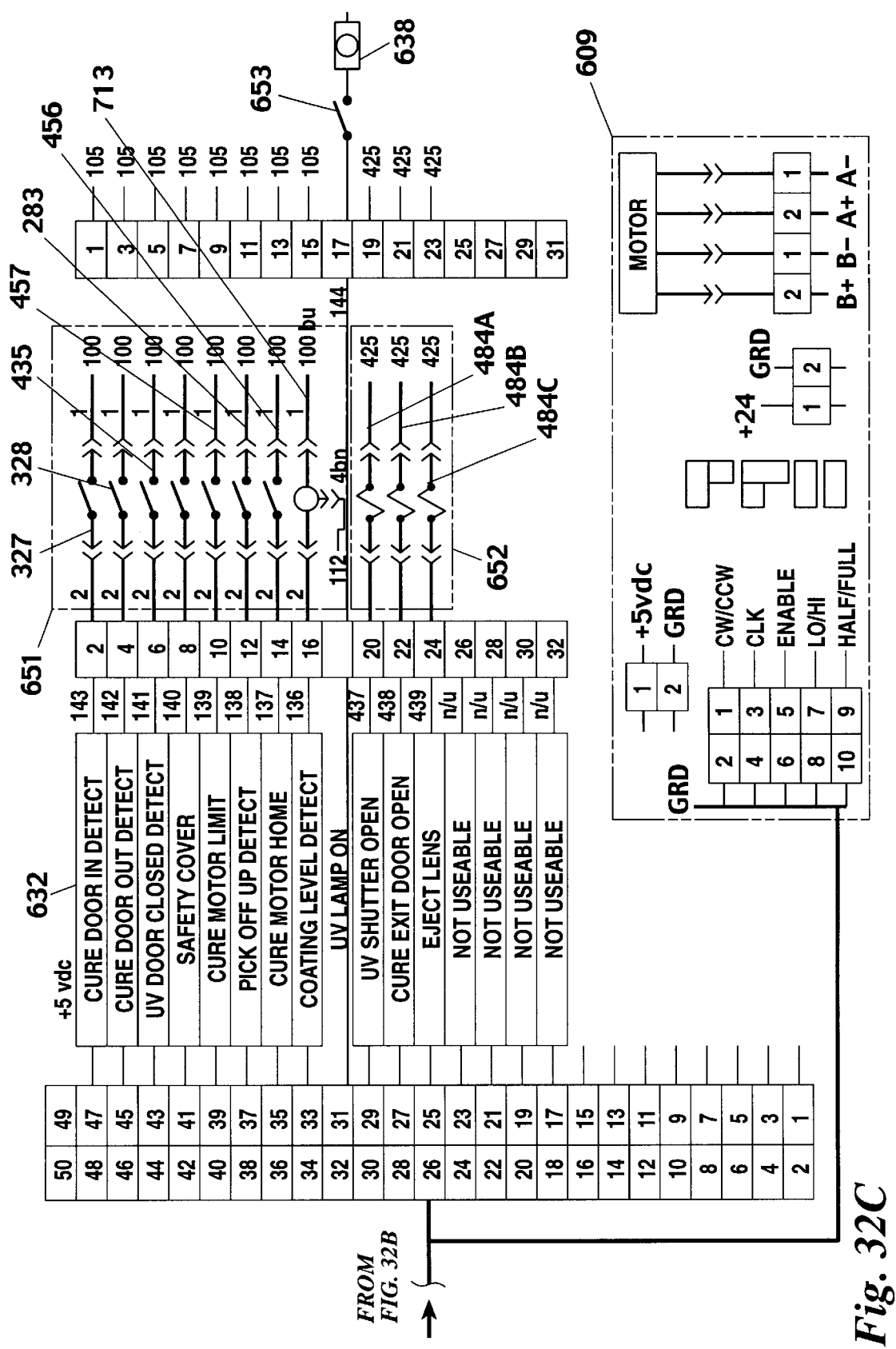
Figure 32D:
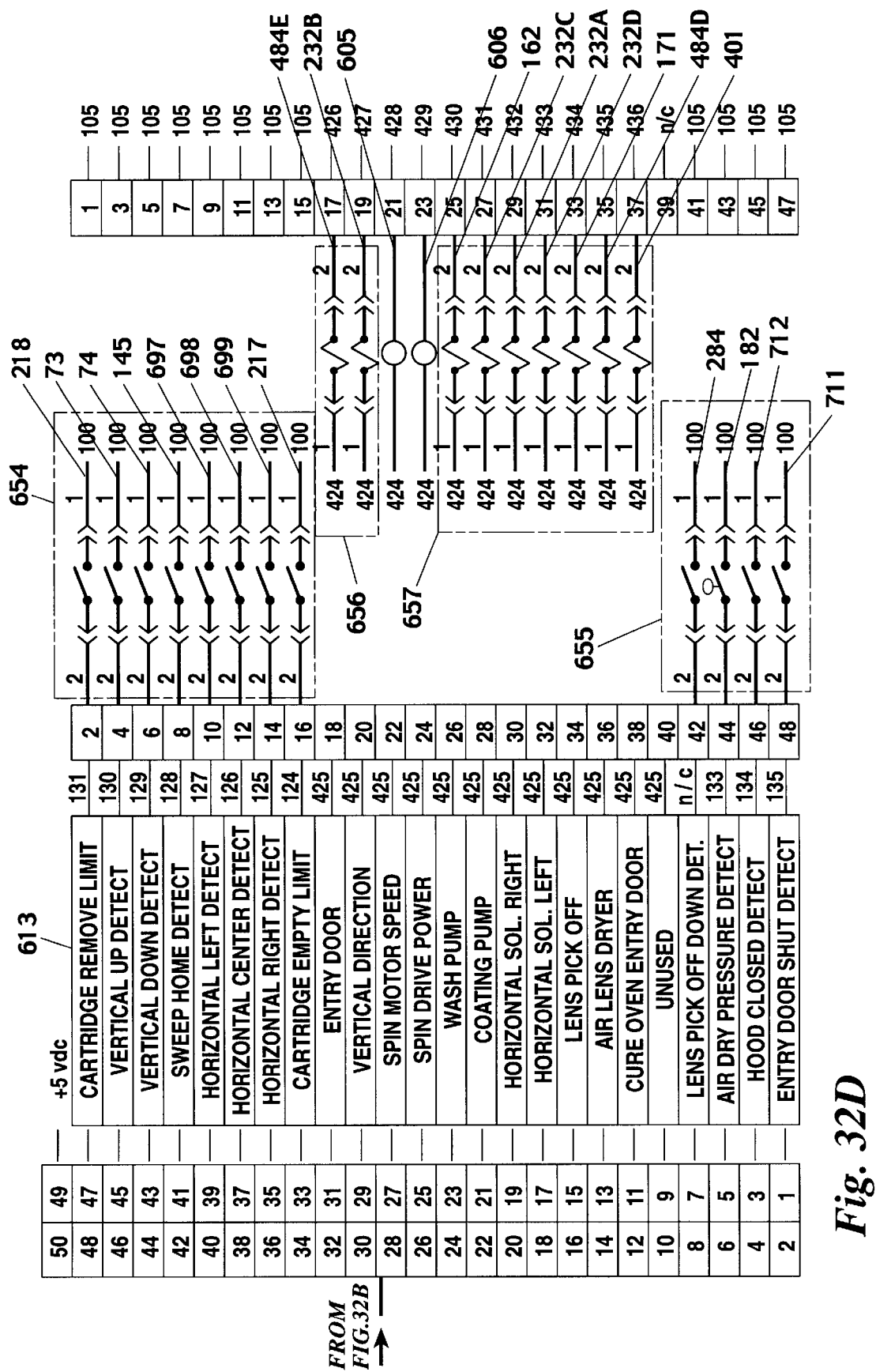

The cure side electrical panel 630 is illustrated in FIGS. 30 and 31. The front side of the panel 630 holds a set of DC terminal blocks 631 and a cure input/output board 632 with three solid state relay modules 633 and eight input modules 634. The solid state relay modules 633 control the operation of the ultraviolet bulb shutter 427, the operation of the exit door 313 of the oven 300 and the operation of the air cylinder 466 of the pick-off arm assembly 420. The input modules 634 signal to the CPU 614 the condition of the inlet door 312 and the outlet door 313 of the cure oven 300, the up limit switch 283 of the pick-off assembly 270, the forward limit switch 457, the ultraviolet bulb shutter door 427, the home switch 456 and the coating level falling below minimum in the coating basin 101. The energization of the ultraviolet bulb 376 is also controlled by the board 632. The front of the panel 630 also contains voltage selector blocks 635 for the ballast 354, AC terminal blocks 636, a cure relay 637, a 25 amp ultraviolet bulb solid state relay 638 and a cure drive board 639. Looking at the back of the panel 630 as shown in FIG. 31, the panel 630 also contains a twenty-four volt 3.5 amp power supply 641.

The interconnect diagram of the lens coating machine is illustrated in FIG. 32. The CPU 614 is connected through the information pack PCB 609 to the probe 207 which in turn contacts the information pack 204. The CPU 614 is also connected through parallel ports 619 to the control panel 660. The utility ports 621 of the CPU 614 are connected to the control panel speaker 667 and to the system clock battery 622. The I/O card of the CPU 614 is connected to the information pack drive board 609, the coat input/output board 613, the cam nozzle assembly drive board 611 and the cure side dive board 639. The 110 card of the CPU 614 is also connected to the cure input/output board 632. The cure input/output board 632 is connected to the inputs 651 and outputs 652 of the cure side assemblies and to the hood switch 653 connecting the cure side ultraviolet bulb solid state relay 638. The coat side of the coat input/output board 613 is connected to inputs 654 and 655 of the coat side components of the lens coating machine and also output to the solenoids 656 and 657 and to the coat side relays 605 and 606.

Turning to the lens coating machine ANC electrical schematic drawing of FIG. 33, the input power terminals 671 are connected to the various machine electrical systems through a pair of eight amp circuit breakers 672 and 673 and a pair of three amp circuit breakers 674 and 675. The circuit breakers 672 and 673 serve the cure oven blower fan 334 and the cure oven muffin fan 359. The fans 334 and 359 are connected in parallel with each other and in series with the thermostat disk 378 of the ultraviolet bulb enclosure 370. The cure blower fan 334 is also connected to the capacitor 352 in the lower chamber 330 of the oven 300. The circuit breaker 672 is also connected through a normally open contact 678 of the cure side relay 637 and a normally open contact 679 of the solid state cure relay 638 and the circuit breaker 673 through a normally open contact 676 of the cure side relay 637 to the ballast 354 of the ultraviolet bulb 376. The automatic thermostatic disk 377 of the ultraviolet bulb enclosure 370 is connected between the ballast 354 and the bulb 376. Thus, when the circuit breakers 672 and 673 are closed, the fans 334 and a 359 operate in response to the operation of the thermostatic disk 378. In addition, when the cure side relay 637 is energized, and the solid state relay 608 and the thermostat 377 permit, the ultraviolet bulb 376 will be energized. The circuit breakers 674 and 675 provide power to the hepa fan 18 and to the temperature control module 677. The circuit breakers 674 and 675 are also connected through normally open contacts 681 and 682 of the main control relay 603 to the cure side twenty-four volt power supply 641, the coat side twenty-four volt power supply 616 and the multi-level power supply 615 of the coat side electrical panel 600. The circuit breaker 674 is also connected through the main control relay contact 681 and another circuit breaker 683 and the circuit breaker 675 through the main control relay contact 682 to the spin motor transformer 607. The secondary side of the spin motor transformer 607 is connected to the spin motor drive board 602. The spin motor 31 is connected in parallel with the resistor 608 in the coat side electrical panel 600 and a normally closed contact 684 of the spin motor power relay 605. This parallel circuit is connected to the spin motor drive board 602 by a normally open contact 685 of the spin motor power relay 605 in the coat side electrical panel 600. The spin motor drive board 602 is also connected to a normally closed contact 686 and normally opened contact 687 of the spin speed control relay 606 to variable resistors 688 and 689 to control the speed of the spin motor 31. Finally, the spin motor drive board 602 is connected across a normally closed contact 691 of the spin motor power relay 605. Thus, when circuit breakers 674 and 675 are closed, the hepa fan 18 operates and the temperature control module 677 is energized. When the main control relay 603 is energized, the low voltage power supplies 641, 616 and 615 are energized. If the fifth circuit breaker 683 is also closed, the spin motor transformer is energized to operate the spin motor 31 through the drive board 602 and the speed control associated therewith. The odor eliminator 692 is also connected across the second pair of circuit breakers 674 ffl and 675. The second pair of circuit breakers 674 and 675 are also connected across a sixth circuit breaker 693 to the primary side of the main transformer 601 located in the coat side electrical panel 600. The secondary side of the power transformer 601 is connected through the normally closed emergency stop switch 523 and the normally opened main power switch 694 to the main power relay 603 and the cure side relay GS7 which are connected in parallel. The secondary side of the transformer 601 is also connected through normally opened contacts 695 and 696 of the main control relay 603 to various coat side and cure side components of the lens coating machine. These include the machine entry door solenoid 232E, the spin motor vertical position solenoid 232B, the spin motor speed control relay 605, the spin power control relay 606, the wash pump solenoid 162, the coat pump solenoid 232C and coat direction solenoid 194 connected in parallel with each other, the horizontal direction right and left solenoid 232A, the lens pick-off solenoid 232D, the air dry solenoid 171, the cure oven entry door solenoid 484D, the cure oven ultraviolet bulb shutter solenoid 484A, the cure oven exit door and machine discharge door solenoid 484C, E and the lens eject solenoid 484B.

MACHINE OPERATION

Figure 34:
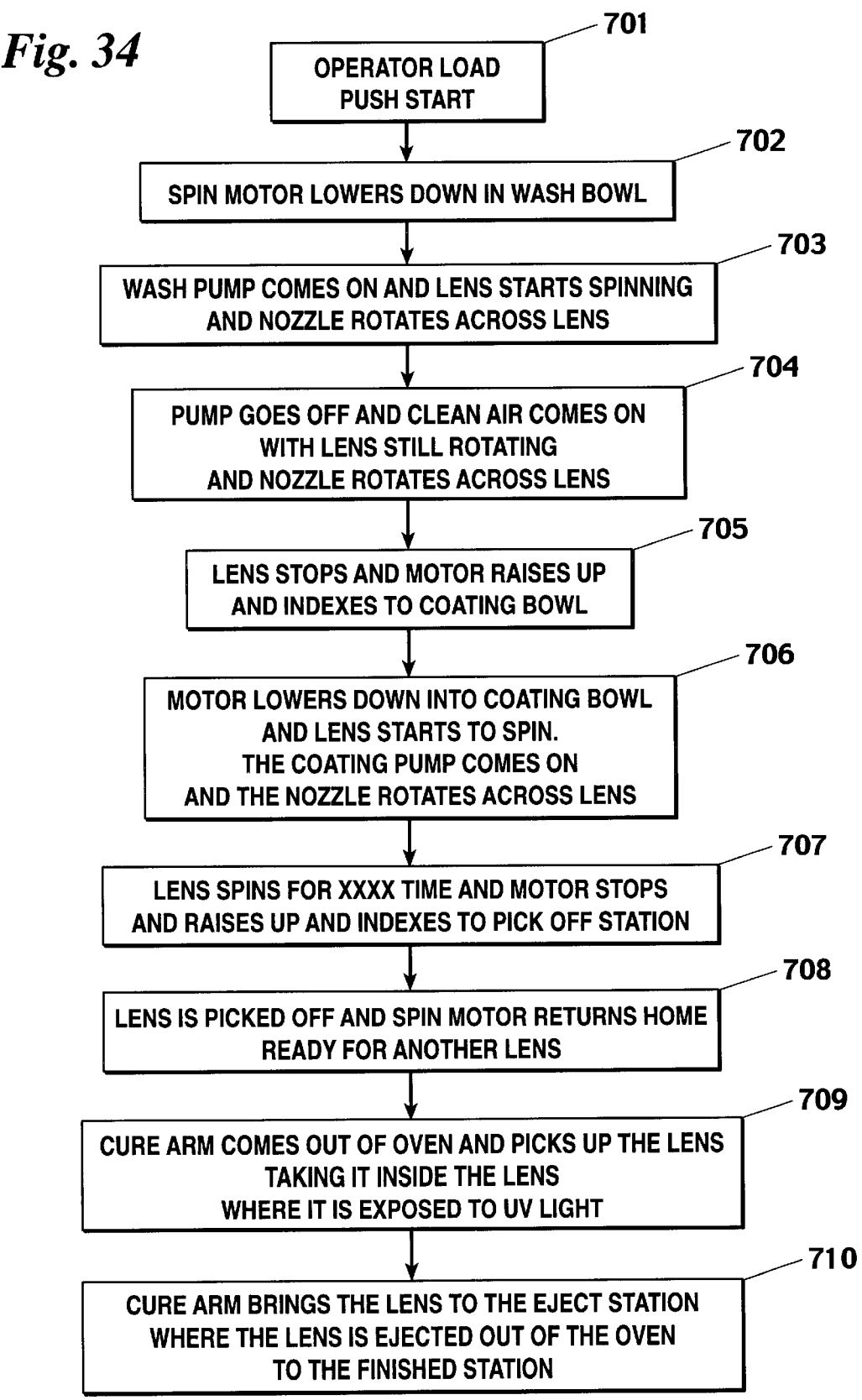
FIG. 34 is a flow chart illustrating the operation of the lens coating machine and method.

Looking at FIG. 34, the overall machine component operation can be understood. In the first step 701, the operator loads the lens onto the spin motor 31 and pushes the start key 662 on the control panel 660. In the next step 702, the spin motor 31 is lowered into the wash basin 81 by the operation of the lift cylinder 66. When the lens has been fully lowered into the wash basin 81 until the slinger 37 covers the wash basin 81, then, in the next step 703, the water pump 151 is energized, the spin motor 31 is energized and the cam nozzle motor 111 is energized so that deionized water is sprayed onto the rotating lens as the water nozzle 121 is directed across the radius of the lens. In the next step 704, the water pump 151 is deenergized and the clean air solenoid valve 171 operated to deliver clean air through the air nozzles 131 and 134 while the cam nozzle motor 111 rotates the air nozzle 131 along the radius of the lens. In the next step 705, the spin motor 31 is deenergized, the spin motor assembly 30 is raised out of the wash basin 81 by the lift cylinder 66 and the rodless cylinder 57 transfers the spin motor assembly 30 to a position over the coating basin 101. In this position, the next step 706 occurs in which the lift cylinder 66 lowers the spin motor assembly 30 to drop the lens into the coating basin 101 until the slinger 37 covers the coating basin 101. The spin motor 31 is energized, the coating pump 191 is energized and the cam nozzle motor 111 is energized to rotate the coating nozzle 138 across the radius of the spinning lens. After the lens has been coated, in the next step 707 the spin motor 31 is permitted to spin for a predetermined time, after which the spin motor is deenergized and the lift cylinder 66 raises the spin motor assembly to remove the lens from the coating basin 101. The rodless air cylinder 57 then causes the lens to be horizontally transferred to the pick-off station assembly 270. In the next step 708, the lens is picked off the spin motor assembly 30 by the engagement of the lens holder adapter 39 with the lens brackets 276 and 277 of the pick-off station assembly 270. The pick-off station assembly 270 is then lowered by the lift cylinder 272 to disengage the lens from the spin motor assembly 30. The spin motor assembly 30 then returns to its home position over the wash basin 81 to receive another lens while the coated lens remains at the pick-off station assembly 270. In the next step 709, the cure arm 451 is t0 extended out of the oven 300 and above the magnet 38 of the lens holder adapter 39. The lift cylinder 272 of the pick-off station assembly 270 raises the lift platform 273 to engage the magnet 38 with the pick-off arm 451. The cam motor 437 of the pick-off arm assembly 420 then operates to withdraw the lens into the upper chamber 310 of the cure oven 300 where it is exposed to light from the ultraviolet bulb 376 as the cam motor 437 causes the lens to be traversed through the ultraviglet light path for a predetermined number of steps of the motor 437. When curing is complete, in the final step 710 the pick-off arm 451 is driven by the cam motor 437 to align the lens in its eject position through the cure oven outlet door 313 and the air cylinder 466 drives the push off 465 to eject the lens out of the upper chamber 310 of the oven 300 and out of the machine through the discharge door 505 to the finish station of the lens coating machine.

To pre-clean the lens before lens coating, approximately 100 ml of cleaning solution is poured into the pre-wash basin 514 of the machine, the lens is chucked on the machine suction cup 41, wiped with a circular motion for three seconds on a sponge in the pre-wash basin 514 and loaded into the machine.

To begin the lens coating process, the power switch 694 on the left-hand side of the machine is pressed. The user interface screen 661 will energize, the blower fan 334 will start, the ultraviolet bulb 376 will begin to warm for two minutes and, when the machine is initialized, the user interface screen 661 will display that the coater and curer are READY. The wet, pre-cleaned lens is then loaded into the machine. The Start button 662 on the operator control panel 660 is pregsed and the machine automatically washes and dries the lens, coats the lens, moves the lens to the cure oven 300 for the cure cycle and extends the lens from the cure oven 300 for operator pick up.

To inspect coated lenses for faults before curing, after the machine is started, pressing the Menu key 664 on the operator control panel 660 two times will display the Mode Select Menu and pressing the Alter key 665 will display the Select Mode field. A lens is pre-cleaned and the wet, pre-cleaned lens is loaded into the machine. Upon pressing the Start button 662 on the operator control panel 660, the machine automatically washes and dries the lens, coats the lens and moves the lens horizontally back to the wash basin position. The lens is then removed and inspected for faults. If the coating is correct, the lens is rechucked and the Start key 662 pressed. The chucked lens moves directly to the cure oven 300 for curing and removal. If the coating is not correct, the lens is cleaned and rechucked. The Stop key 663 is pressed to recoat the chucked lens. This inspection process can be continued until the Start key 662 is pressed.

To inspect coated lenses for faults after passing through the cure oven but without being cured, after the machine is started, the Menu key 664 on the operator control panel 660 is pressed two times to display the Mode Select Menu. The Alter key 665 is pressed until UNCURED displays in the Select Mode field, A lens is pre-cleaned and loaded into the machine. The Start button 662 on the operator control panel 660 is pressed and the machine automatically washes and dries the lens, coats the lens, moves the lens through the cure oven 300 without being cured and extends the lens from the cure oven 300 for operator pick up and inspection. The lens is removed and inspected for faults. If the coating is correct, the lens is rechucked. The Start key 662 is pressed and the chucked lens moves directly to the cure oven 300 for curing and removal. If the coating is not correct, the lens is cleaned and rechucked at the wash basin 81. The Stop key 663 is pressed to recoat the chucked lens. This inspection process can be continued until the Start key 662 is pressed.

SPECIFIC OPERATIONAL MODES

The machine hereinbefore described is a fully automatic lens coater designed to produce a coated and cured lens every 60 seconds. The machine has three operational modes:

(1) a Normal Mode used for automatic cleaning, coating and curing:

(2) an Inspect Mode used to inspect coated lenses before placement into the curing oven; and (3) an Uncured Mode used to inspect coated lenses after placement into the curing oven but without curing so as to determine if the curing oven is the cause of a contaminated lens coating.

Normal Mode Operation

After the machine is set up, the only operator participation is to chuck the lens on the front end of the process, press a key, and pick up the coated/cured lens on the back end. The bulk of the work is handled by the lens coater operational process hereinafter described. The pre-cleaned, chucked lens is immersed into the wash basin 81 which contains deionized water, spun, and dried with medical air. After drying, the lens is moved horizontally to the coating basin 101. At the coating basin 101, the coating nozzle 138 sprays coating onto a radius of the lens as the lens is spun to cause an even application of coating. After coating, the lens is moved horizontally to the pick-ff station 270 where it is dechucked. The pick-off arm 451 extends through the cure oven inlet door 312 and picks off the chucked lens. The pickoff arm 451, with the coated lens, retracts into the cure oven 300 and the inlet door 312 closes. Light from an ultraviolet cure oven lamp 376 no is passed by the lamp shutter 427 for a period of time that can be set using a Nominal Cure Tie Menu at the control panel 660. After the nominal cure time expires, the cure oven outlet door 313 opens. The push-off 465 extends the cured lens through the cure oven outlet door 313 and the machine discharge door 505 for operator pick up. The machine is ready for another coating operation.

Inspect Mode Operation

The inspect mode of operation is accessed from the Mode Select Menu and is used to inspect coated lenses before placement into the curing oven 300. If the coating is not correct, the lens can be cleaned with solvent and reused.

In the inspect mode of operation, the pre-cleaned, chucked lens is immersed into the wash basin 81, spun, and dried with medical air. After drying, the lens is moved horizontally to the coating basin 101. At the coating basin, the coating nozzle 138 sprays coating onto a radius of the lens as the lens is spun to cause an even application of coating. The coated lens is returned to the wash position where it can be dechucked for inspection prior to being cured. If the coating is correct, pressing the Start key 662 causes the chucked lens to be moved directly to the cure oven 300. If the coating is not correct, pressing the Stop key 663 causes the chucked lens to be moved to the coating basin 101 to be recoated.

Uncured Mode Operation

The uncured mode of operation is used to determine if the curing oven 300 is the cause of a contaminated lens coating. This mode of operation is accessed from the Mode Select Menu using the menu key 664. The uncured mode of operation is identical to the physical movement of a normal mode lens coating operation, except that the ultraviolet lamp 376 in the cure oven 300 is not energized to cure the coated lens. The coated lens can be removed from the cure oven 300 to determine if the cure oven 300 was the cause of contaminants.

Menus

The operator control panel 660 is the operator's interface with the machine. The control panel 660 is used to set the operational mode, begin the lens coating process, set operating parameters and diagnose and troubleshoot the system. The menu structure of the operator interface includes a variety of menus which are accessed from the operator control panel 660 using the menu key 664. These menus are used to set machine operating parameters and to diagnose the operational functionality of the machine. The machine control panel 660 includes a variety of separate menus which display in the menu/message display screen 661. The Menu key 664 is used to scroll through the menus of the machine in sequential order. On many of the separate operational menus, more than one machine parameter can be set. For example, the Time Setup Menu has two separate fields for time parameters, PRESENT TIME and TIME FORMAT. The Next key 666 is used to toggle between the fields. After one parameter is set, one press of the Next key 666 moves focus to the next parameter. The Alter key 665 is used to change the current setting of a machine menu setting. For example, the default for the CURE TIME field on the Nominal Time Menu can be changed by pressing the Alter key 665 after focus is on the CURE TIME. The Start key 662 is used to start the lens coating process. The Stop key 663 halts the lens coating process.

The Main Menu displays after the machine power switch 694 on the left-hand side of the machine has been turned to the ON position and the initialization sequence has to been completed. This menu indicates the operating status of the coater and curer as READY or NOT READY. rrom the Main Menu, one press of the Menu key 664 on the operator control panel 660 will display the Coating Dwell Menu which controls the delay time between the start of the coating pump 191 and the start of the coating application sweep of the coating nozzle 138 across the lens so as to eliminate anomalies the center of the lens. The range of dwell times is typically from 0.0 seconds to 0.9 seconds. From the Main Menu, two presses of the Menu key 664 on the operator control panel 660 will display the Mode Select Menu. From the Mode Select Menu, the three separate operating modes can be selected. From the Main Menu, three presses of the Menu key 664 on the operator control panel 660 will display the Charge/Purge Menu. After installation of the machine, the Charge/Purge Menu is used for two important functions before lens coating can begin. The Coating Charge is typically a 25-minute cycle of 10 second on/10 second off intervals used to charge or mix the coating material. Charging obtains an equal coating temperature which is necessary for successful lens coating. Two 25-minute purge cycles, are recommended after installation of the machine. The coating purge is a 5 minute cycle used to empty the coating reservoir 102 for cleaning. While at this menu, the coating cannot be auto-dispensed. The washing charge is a 25 minute cycle of 10 second on/10 second off intervals used to remove air from the wash lines and charge the system. The washing purge is a 5 minute cycle used to empty water from the lines before line removal. From the Main Menu, four presses of the Menu key 664 on the operator control panel 660 will display the Cartridge Screen. The Cartridge Screen is used to replace the coating cartridge 202 when the level is low. When the Start key 662 is pressed, the cartridge plunger 209 is withdrawn from the cartridge tube 202 to allow removal. After returning to the Main Menu, the coating is replenished, if needed.

From the Main Menu, five presses of the Menu key 664 on the operator control panel 660 will display the Time Setup Menu. The machine time format can be set to military or standard time. The NEXT key 666 toggles between the time and format fields. When the cursor is in the appropriate field, the ALTER key 665 changes the time or format.

From the Main Menu, six presses of the Menu key 664 on the operator control panel 660 will display the first Diagnostic Display Menu. The Diagnostic Display Menu includes four sub menus which can be accessed by sequentially pressing the NEXT key 666. The Diagnostic Display menu checks the ability of the pixels of the screen 661 to turn on and off. The Diagnostic Display Menu is used to test the functionality of the display screen 661. From the Main Menu, seven presses of the Menu key 664 on the operator control panel 660 will display the first Diagnostic Sensor Menu. The Diagnostic Sensor Menu includes four sub menus which are accessible sequentially by pressing the NEXT key 666 on the operator control panel 660. The first Diagnostic Sensor Menu is used to monitor the pre-wash water level according to the cap sensor. The position of the hood 510 is monitored by the hood sensor reed switch 702. The second Diagnostic Sensor Menu is used to monitor the position of the limit switches 217 and 218 of the information pack 204 and the coating sweep home reed switch 145. The third Diagnostic Sensor Menu is used to monitor the pick-off up and down switches 283 and 284 of the pick-off station 270. It also determines the home position of the cure oven pick-off arm 451 near center of travel. The fourth Diagnostic Sensor Menu is used to determine the ultraviolet output of the lamp 376 in the curing oven 300. The range is 150% (normal) to 0% (nominal). A low intensity percentage indicates the need to replace the ultraviolet bulb 376, extend the cure time, or clean or replace the sensor 409.

From the Main Menu, eight presses of the Menu key 664 on the operator control panel 660 will display the first Diagnostic Output Menu. The Diagnostic Output Menu includes eleven sub menus which are accessible sequentially by pressing the NEXT key 666 on the operator control panel 660. The first Diagnostic output Menu is used to test the position of the lens discharge door 505. When the cursor is in this field, the Alter key 665 toggles the lens discharge door 505 open or closed. The Door Sensor field indicates the current position of the door 505. The second Diagnostic Output Menu is used to test the performance of the vertical cylinder 66 and the up and down switches 73 and 74. The third Diagnostic Output Menu is used to test the functionality (on/off) and speed of the drive motor 31. The Next key 666 toggles the cursor position between the two fields. The fourth Diagnostic Output Menu is used to test the functionality (on/off) of the water pump 151 and coating pump 191. However, the water pump 157 and coating pump 191 can be tested only when the machine senses that the hood 510 is closed. The fifth Diagnostic output Menu is used to test the hold preoture on both sides of the rodles cylinder 57 and the left, intermediate and right switches 697, 698 and 699. The sixth Diagnostic Output Menu is used to test the functionality of the lens pick-off assembly 270. The seventh Diagnostic Output Menu is used to test the functionality of the air drying solenoid 171 and sensor 182. The eighth Diagnostic Output Menu is used to test the functionality of the inlet door 312 and the inlet door sensor 327. The ninth Diagnostic Output Menu is used to test the functionality of the cure oven exit door 313 and the exit door sensor 328. The tenth Diagnostic Output Menu is used to test the functionality of the lens eject cylinder 466. The door 313 opens and the lens is extended. The cure torque sets voltages that control the low and high torque on the drive of the cure oven stepper motor 437. The eleventh Diagnostic Output Menu is used to test the functionality of the coating cartridge torque adjustment of the information pack drive board 609.

From the Main Menu, nine presses of the Main key 664 on the operator control panel 660 will display the Cure Offset Menu. The Cure Offset Menu is used to reposition or set the home position offset for aligning the lens eject mechanism 465 with the lens holder 39. Proper alignment of the cure arm 451 and the eject cylinder 466 is necessary for the stable ejection of lenses. A ±64 mm cure offset setting is preferred.

From the main menu, ten presses of the Menu key 664 on the operator control panel 660 will display the Coating Offset Menu. The Coating Offset Menu is used to reposition or set the position of the coating nozzle 138 in reference to the center of the lens.

From the Main Menu, eleven presses of the Menu key 664 on the operator control panel 660 will display the Nominal Time Menu. The Nominal Time Menu is used to set the exposure time of the ultraviolet bulb 376 in the cure oven 300. The length of exposure can be increased or decreased depending on the Adjust field setting. The Next key 666 is used to set the cursor in the Cure Time field, and the Alter key 665 is used to adjust the time. A nominal cure time setting of 20.6 seconds is preferred.

From the Main Menu, twelve presses of the Menu key 664 on the operator control panel 660 will display the Version Menu. The Version Menu displays the current version number of the software information pack 204 in the machine.

From the Main Menu, thirteen presses of the Menu key 664 on the operator control panel 660 will display the Lens Usage Menu. The Lens Usage Menu displays the total amount of lenses coated by the machine and the total since the lamp power up.

Thus, it is apparent that there has been provided, in accordance with the invention, a process and machine for coating ophthalmic lenses that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A process for coating a surface of an ophthalmic lens comprising the steps of:
   chucking the lens to a lower end of a rotatable vertical shaft;
   lowering the shaft and the chucked lens vertically into a wash/dry basin;
   spinning the shaft and the chucked lens in the wash/dry basin;
   washing the lowered lens in the wash/dry basin;
   drying the waghed lens in the wash/dry basin;
   raising the shaft and the dried lens vertically from the wash/dry basin;
   transferring the shaft and the dried lens horizontally from above the wash/dry basin to above a coating basin;
   lowering the shaft and the dried lens vertically into the coating basin;
   spinning the shaft and the dried lens in the coating basin; and
   coating the dried lens in the coating basin.

2. A process according to claim 1 said step of chucking the lens comprising the substeps of:
   manually inserting the lens through an access door into a coating machine enclosure containing the basins;
   manually connecting the lens to the lower end of the rotatable vertical shaft;
   closing the access door.

3. A process according to claim 2 further comprising the step of initiating positive pressure in the enclosure before washing the lens.

4. A process according to claim 2 further comprising the step of initiating positive pressure in the enclosure before washing the lens further comprising the step of initiating filtration of air in the enclosure before washing the lens.

5. A process according to claim 1, said substep of lowering the chucked lens further comprising the substep of simultaneously covering the wash/dry basin as the lens is inserted therein.

6. A process according to claim 1, said step of washing the loaded lens comprising the substeps of:
   spinning the lens in the wash/dry basin at a predetermined washing speed about approximately a radial center thereof;
   initiating flow of a stream of deionized water from an upwardly directed water nozzle against the center of the spinning lens;
   arcing the water nozzle to cause said stream of deionized water to trace a substantially radial path relative to the spinning lens;
   ceasing the flow of said stream of deionized water;
   returning the water nozzle to its upward direction; and
   ceasing spinning of the lens.

7. A process according to claim 6, said step of arcing the water nozzle comprising reciprocating the water nozzle outwardly at a low speed, inwardly at a high speed and outwardly at the low speed to cause the stream of deionized water to three times trace a substantially radial path relative to the spinning lens.

8. A process according to claim 1, said step of drying the washed lens comprising the substeps of:
   spinning the lens in a basin at a predetermined drying speed about approximately a radial center thereof;
   initiating flow of a first stream of air from a substantially upwardly directed first air nozzle against approximately a center of the surface of the spinning lens and a second stream of air from a second air nozzle directed inwardly and upwardly against a lower edge of the spinning lens;
   arcing the first air nozzle to cause the first stream of air to trace a substantially radial path relative to the spinning lens; and
   ceasing the flow of said first and second streams of air.

9. A process according to claim 8, said step of arcing the first air nozzle comprising reciprocating the first air nozzle outwardly at a low speed, inwardly at a high speed and outwardly at the low speed to cause the first stream of air to three times trace a substantially radial path relative to the spinning lens.

10. A process according to claim 8 further comprising the step of ceasing spinning the lens.

11. A process according to claim 1, further comprising the step of transferring the coated lens to a curing oven.

12. A process according to claim 11, said step of transferring the coated lens to a curing oven comprising the substeps of:
   raising the shaft and the coated lens vertically from the coating basin;
   moving the lens laterally to a pick-up station;
   releasing the coated lens at the pick-up station;
   picking up the coated lens with a retractable assembly mounted in the curing oven;
   retracting the assembly to deliver the coated lens through an open receiving door of the curing oven; and
   closing the receiving door of the curing oven.

13. A process according to claim 1, further comprising the step of curing the transferred coated lens.

14. A process according to claim 13, said step of curing the transferred coated lens comprising the substeps of:
- opening a first shutter shielding an energized ultraviolet light source directed at the lens;
- closing the shutter when a predetermined period of time elapses after opening the shutters; and
- opening a closed discharge door of the curing oven.

15. A process according to claim 14 further comprising the step of transferring the lens across a path of light emanating from the ultraviolet light source while the first shutter is open.

16. A process according to claim 14 further comprising the step of opening a second shutter shielding an ultraviolet light sensor simultaneously with opening said first shutter to measure the amount of ultraviolet light to which the lens is exposed.

17. A process according to claim 14, further comprising the steps:
- picking up the cured lens with a retractable assembly mounted in the oven;
- extending the lens through an open discharge door of the enclosure: and
- manually collecting the cured lens from the extended retractable assembly.

18. A process according to claim 1, said step of lowering the dried lens further comprising the substep of simultaneously covering the coating basin as the lens is inserted therein.

19. A process according to claim 1, said step of coating the transferred dried lens comprising the substeps of:
- spinning the lens in a basin at a predetermined first coating speed about approximately a radial center thereof;
- initiating flow of a stream of coating material from a substantially upwardly directed coating nozzle against approximately the center of the surface of the spinning lens;
- arcing the coating nozzle outwardly to direct the stream of coating material across a radial line in relation to the spinning lens to achieve a desirable distribution of the coating material on the surface of the lens;
- ceasing the stream of coating material; and
- increasing the spinning speed of the lens to a predetermined second coating speed to thin the coating material on the concave surface of the lens.

20. A process according to claim 19, said step of initiating flow of a stream of coating material occurring after a predetermined time of spinning at the first coating speed elapses.

21. A process according to claim 19 further comprising the step of ceasing spinning of the lens.

22. A process according to claim 1 further comprising the steps of sequentially coating a plurality of lenses and intermittently automatically injecting a predetermined quantity of coating material into the coating basin after a predetermined number of the plurality of lenses have been coated.

23. A process according to claim 22 further comprising the step of indicating an inability to automatically inject coating material into the basin.

24. A process according to claim 1 further comprising the steps of:
- sensing the level of coating material in the coating basin; and
- terminating the process if the level of coating material falls below a predetermined threshold level.

25. A process according to claim 1 further comprising the steps of:
- sensing the level of coating material in the coating basin; and
- automatically injecting a quantity of coating material into the basin if the level of coating material falls below a predetermined threshold level.

* * * * *